(12) United States Patent
Saito et al.

(10) Patent No.: US 6,904,284 B2
(45) Date of Patent: Jun. 7, 2005

(54) WIRELESS COMMUNICATION APPARATUS

(75) Inventors: Rie Saito, Kanagawa (JP); Mitsuhiro Watanabe, Kanagawa (JP); Mitsuru Otsuka, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 651 days.

(21) Appl. No.: 09/907,368

(22) Filed: Jul. 17, 2001

(65) Prior Publication Data

US 2002/0013151 A1 Jan. 31, 2002

(30) Foreign Application Priority Data

Jul. 18, 2000 (JP) ....................................... 2000-217488

(51) Int. Cl.[7] ................................................ H04Q 7/20
(52) U.S. Cl. .................... 455/450; 455/422.1; 455/509; 370/320; 370/337
(58) Field of Search .......................... 455/422.1, 435.1, 455/450, 451, 452.1, 453, 509, 514, 465; 370/465, 468, 337, 347, 320

(56) References Cited

U.S. PATENT DOCUMENTS

| | | | |
|---|---|---|---|
| 5,613,220 A | 3/1997 | Arai | |
| 5,687,218 A | 11/1997 | Nakayama | |
| 5,771,457 A | 6/1998 | Tsutsui | |
| 5,802,469 A | * 9/1998 | Nounin et al. ............ | 455/422.1 |
| 6,016,311 A | 1/2000 | Gilbert et al. .............. | 370/280 |
| 6,081,536 A | 6/2000 | Gorsuch et al. ............ | 370/468 |
| 6,088,578 A | * 7/2000 | Manning et al. ............ | 370/347 |
| 6,144,725 A | 11/2000 | Kurosawa et al. | |
| 6,243,583 B1 | 6/2001 | Tsutsui | |

FOREIGN PATENT DOCUMENTS

| | | |
|---|---|---|
| EP | 0 977 377 A1 | 2/2000 |
| WO | WO 95/23485 | 8/1995 |
| WO | 98/09457 | 3/1998 |
| WO | 99/65259 | 12/1999 |
| WO | 01/74096 | 10/2001 |

* cited by examiner

*Primary Examiner*—David Hudspeth
*Assistant Examiner*—Kamran Afshar
(74) *Attorney, Agent, or Firm*—Morgan & Finnegan, LLP

(57) ABSTRACT

A wireless communication apparatus stores a plurality of cellular phones in an extension, connects a plurality of cellular phones to a base station, and sets up the communication speed of a communication channel to a base station according to the communication speeds of a plurality of the cellular phones. The wireless communication apparatus maintains the communication speed of a communication channel when a total sum of the speed of the communication which one of the plurality of cellular phones starts and the speed of the communication previously performed is equal to or less than the communication speed of the communication channel. An IMT2000 network stores the wireless communication apparatus and the base station corresponding to a plurality of cellular phones in a location registration database and processes incoming calls to a plurality of cellular phones according to the location registration database. Further, the IMT2000 network performs a location registration to a public network corresponding to a plurality of cellular phones (PHS, PDC).

27 Claims, 18 Drawing Sheets

FIG. 15

HLR 1001

| N | SUBSCRIBER'S NUMBER | LOCATION IDENTIFICATION NUMBER WITHIN SERVICE AREA |
|---|---|---|
| 1 | 09015151515 | LA-1 |
| 2 | 09026262626 | LA-2 |
| .. | .. | .. |

HLR FOR PHS TERMINAL 1005 / 1002, 1006

| N | SUBSCRIBER'S NUMBER | IMT SUBSCRIBER'S NUMBER | LOCATION IDENTIFICATION NUMBER WITHIN SERVICE AREA |
|---|---|---|---|
| 1 | 07012345678 | 09037373737 | LA-3 |
| 2 | 07012121212 | 0904848484 | LA-2 |
| .. | .. | .. | .. |

HLR FOR PDC TERMINAL 1003

| N | SUBSCRIBER'S NUMBER | IMT SUBSCRIBER'S NUMBER | LOCATION IDENTIFICATION NUMBER WITHIN SERVICE AREA |
|---|---|---|---|
| 1 | 09098989898 | 09059595955 | LA-2 |
| 2 | 09087654321 | 09037373737 | LA-3 |
| .. | .. | .. | .. |

| N | SUBSCRIBER'S NUMBER (1102) | NETWORK IDENTIFICATION NUMBER WITHIN SERVICE AREA (1103) | LOCATION IDENTIFICATION NUMBER WITHIN SERVICE AREA (1104) |
|---|---|---|---|
| 1 | 07013131313 | — | PLA-1 |
| 2 | 07024242424 | — | PLA-2 |
| 3 | 07035353535 | — | PLA-3 |
| 4 | 07046464646 | — | PLA-2 |
| .. | .. | .. | .. |
| n | 07012345678 | ITM2000 | — |
| .. | .. | .. | .. |

(1101, 1105)

WIRELESS COMMUNICATION APPARATUS

BACKGROUND OF THE INVENTION

1. Field of the Invention

The present invention relates to a wireless communication apparatus.

2. Related Background Art

While PHS (Personal Handy-Phone System) cellular phone may be used as a mobile terminal in a public mobile communication network, it may be accommodated in a home antenna of PHS as an extension terminal.

This home antenna is set up at a location such as a window side of a residence facing a road which is receivable of public radio waves notwithstanding being weak and receives public radio waves and converts them into self-manageable frequencies, so that a plurality of PHS cellular phones arranged in the interior of the residence can receive public incoming calls.

FIG. 1 is a view showing the constitution of the conventional PHS cellular phone system.

In FIG. 1, the PHS cellular phone (1501 to 1505) as the extension terminal performs a communication with a wireless communication apparatus (1511) by using the PHS (1506 to 1510) as communication means (system). This wireless communication apparatus (1511) is the above described home antenna.

The wireless communication apparatus (1511) performs a communication with a base station (1513) by using the PHS (1512) also as communication means.

The base station (1513) is connected with a PHS network (1514), and the PHS network (1514) is connected to a wired network (1515), a PCD network (1516) and a cdmaOne network (1517).

Each mobile communication network (1514, 1515, 1517) is provided with a service control office (SCP: Service Control Point) (1514-1, 1515-1, 1516-1), and the control of each mobile communication terminal is performed here.

FIG. 2 is a flowchart showing the procedure of a call out process performed in the wireless communication apparatus (1511) in the above described conventional PHS cellular phone system.

In FIG. 2, when a call out is made (S1601) from any of the affiliated PHS cellular phone (1501 to 1505), the wireless communication apparatus (1511) determines (S1602) whether the destination terminal of the call out is any of the affiliated PHS cellular phones (1501 to 1505) and, when it is any of the affiliated phones, performs an incoming process for the destination terminal PHS cellular phone (S1603).

On the other hand, when the destination terminal is not any of the affiliated PHS cellular phones (1501 to 1505), a new wireless link is established (S1604) between it and the base station (1513), and call out information such as dial information is notified to the PHS network (1514) (S1605).

FIG. 3 is a flowchart showing the procedure of a disconnection process performed in the wireless communication apparatus (1511) in the above described conventional PHS cellular phone system.

In FIG. 3, within the affiliated PHS cellular phones (1501 to 1505), when a disconnection operation is performed (S1701) in the PHS cellular phone during speech, it is determined (S1702) whether the partner terminal is any of the affiliated PHS cellular phones (1501 to 1505) and, when it is any of the affiliated phones, the disconnection process is performed for the PHS cellular phone of the partner terminal (S1703). When it is not any of the affiliated phones, the disconnection process of the wireless link, which has been established between the wireless communication apparatus and the base station (1513) and used for speech, is performed (S1704).

Note that the PHS cellular phones (1501 to 1505) perform a location registration for the PHS network (1514) when a power source is built up (or when the home antenna is set up) in order to make a public incoming call possible.

FIG. 4 is a view showing a location registration sequence in the above described conventional PHS cellular phone. The location registration will be described with reference to FIG. 4.

When the PHS cellular phone (1501) transmits a location registration request (1801) to the wireless communication apparatus (1511), the wireless communication apparatus (1511), which has received this, converts the radio frequency and the like for a public use and transmits the location registration request (1802) to the base station (1513).

The base station (1513), which has received this, transmits a HLR update request (1803) to a service control office SCP (1514-1) of the PHS network (1514).

A HLR (Home Location Register, 1804) is a data base for controlling subscribers of its own network, which the service control office (SCP) (1514-1) of the PHS network (1514) is provided with.

The HLR (1804) is stored with a subscriber's number of the PHS cellular terminal and a location identification number within the service area showing a location area (LA) of the base station (or one or a plurality of switch boards which accommodate the base station) in whose service area the PHS cellular terminal and the wireless communication apparatus exist.

The service control office SCP (1514-1) which has received the HLR update request (1803) updates the location area (LA) of the base station within the service area of the PHS cellular terminal (1501) in the HLR (1804) to a location area (LA) of the base station (1513) (1804).

In this way, when the location registration normally finishes, a HLR update response (1805) is transmitted from the service control office SCP (1514-1) of the PHS network (1514) and a location registration response (1806) is notified to the wireless communication apparatus (1511) through the base station (1513). The wireless communication apparatus (1511), which has received this, converts the radio frequency and the like for its own use and notifies to the PHS cellular phone (1501) of a location registration response (1807).

Note that the location registration request and the response thereof are simplified for simplicity's sake, which actually include a certifying procedure, a secret designation procedure and the like.

In this way, in the above described conventional PHS cellular phone system, the wireless communication apparatus (1511) wirelessly connects with the PHS cellular phones (1501 to 1505) by the communication means (the communication systems) which are referred to as PHS (1506 to 1510) and further wirelessly connects with the public wireless base station (1513) by the communication means (the communication system) which is referred to as the PHS (1512).

That is, the wireless communication apparatus (1511) is provided only with a single wireless communication means (a wireless communication system) and therefore a cellular phone by way of wireless communication system other than the PHS can not be wirelessly connected with the wireless communication apparatus (1511).

When the PHS wireless cellular phones (1501 to 1505) start communications (call establishment) with the PHS network (1514) through the base station (1513), it is necessary to establish a new link between the wireless communication apparatus (1511) and the base station (1513) (a step S1604 of FIG. 17), which imposes a great load on a limited wireless resource.

SUMMARY OF THE INVENTION

The present invention is made in view of these problems and its object is to effectively use a wireless link between a base station and a wireless communication apparatus.

When a plurality of wireless communication apparatuses simultaneously communicates with a public network, another object is to avoid the wasteful use of a wireless resource.

Another object of the present invention is to be able to call out from the base station a communication apparatus which communicates according to a communication system different from the communication system of the base station.

Still another object is to provide a wireless communication apparatus, which can store the wireless communication terminal of a different wireless communication means (wireless communication system) as an extension communication terminal.

BRIEF DESCRIPTION OF THE DRAWINGS

FIG. 15 is a view showing one example of a data stored in a HLR (904);

FIG. 16 is a view showing one example of the data stored in the HLR (906);

DETAILED DESCRIPTION OF THE PREFERRED EMBODIMENTS

Figure 5:
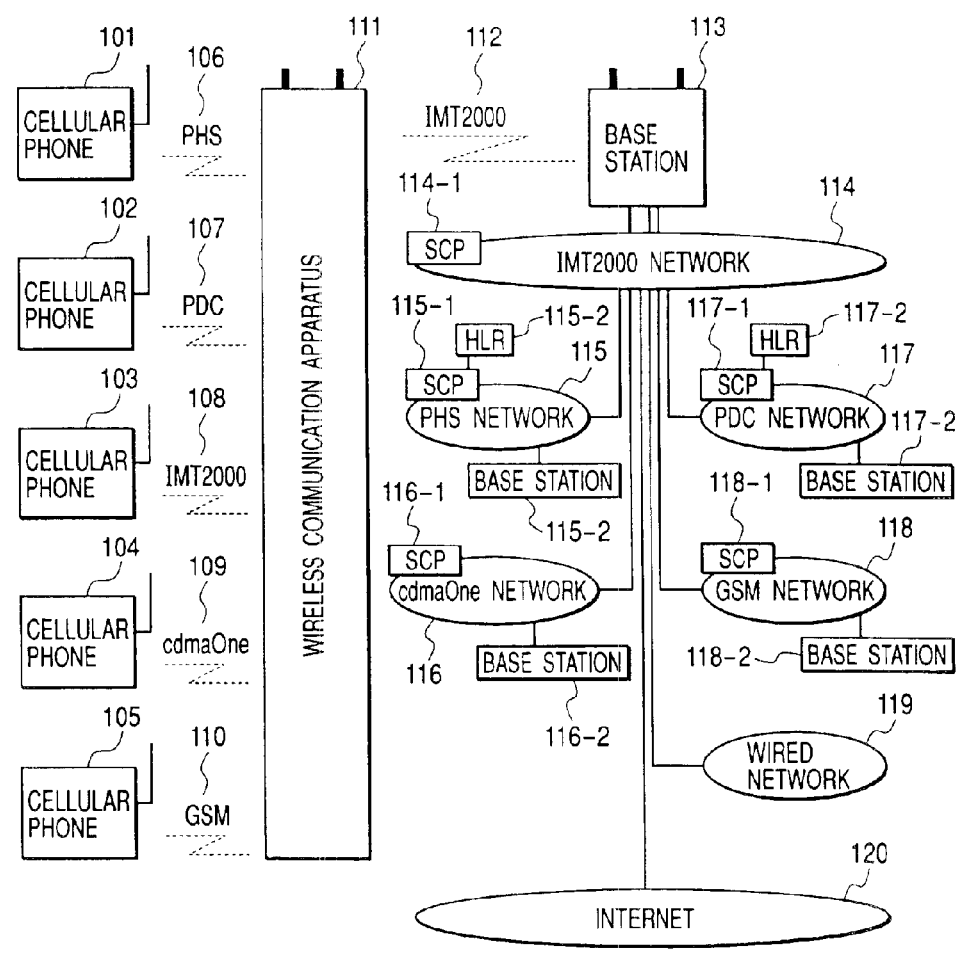
FIG. 5 is a view showing the constitution of one aspect of the embodiment of a wireless communication system including the wireless communication apparatus according to the present invention.

FIG. 5 is a view showing the constitution of a wireless communication system including a wireless communication apparatus 111, which adapts the present invention.

Note that when wireless communication terminals (cellular phones) (101 to 105) are stored as extension terminals of the wireless communication apparatus (111), they can also be used as mobile terminals of a public mobile communication network (114).

In FIG. 5, cellular phones (101 to 105) as wireless communication means (systems) use respectively a PHS (106), a PDC (Personal Digital Cellular, a digital cellular phone system standardized in Japan, 107), an IMT 2000 (International Mobile Telecommunication 2000, the next generation system of the mobile communication system laid down by ITU, 108), a cdmaOne (a wireless communication system mode adapting the "IS-59" regulation as an wireless interface, 109) and a GSM (Global system for mobile communications, the digital cellular phone system mode standardized by Europe, 110), and a communication with the wireless communication apparatus (111) is performed by using these wireless communication means.

The wireless communication between the wireless communication apparatus (111) and a base station (113) is performed by using the IMT 2000 (112).

The base station (113) is connected with an IMT 2000 network (114), and the IMT 2000 network (114) is connected with a PHS network (115), a PDC network (117), a cdmaOne network (116), a GSM network (118), a wired network (119) and an internet network (120).

Each mobile communication network (114, 115, 116, 117, 118) is provided with the service control office SCP (114-1, 115-1, 116-1, 117-1, 118-1) and the control of each mobile communication terminal is performed here.

Each mobile communication network (114, 115, 116, 117, 118) is connected with the base station (114-2, 115-2, 116-2, 117-2, 118-2) and respectively performs a send and receive of a PHS signal, a cdmaOne signal, a PDC signal cellular phone and a GSM signal with a PHS cellular phone, a cdmaOne cellular phone, a PDC cellular phone and a GSM cellular phone. The service control office SCP of each mobile communication network (114, 115, 116, 117, 118) is provided with a HLR (Home Location Register). In FIG. 5, as representing the HLRs of those service control offices SCP, the HLR (115-2) of the PHS network (115) and the HLR (117-2) of the PDC network (117) are shown.

Figure 6:
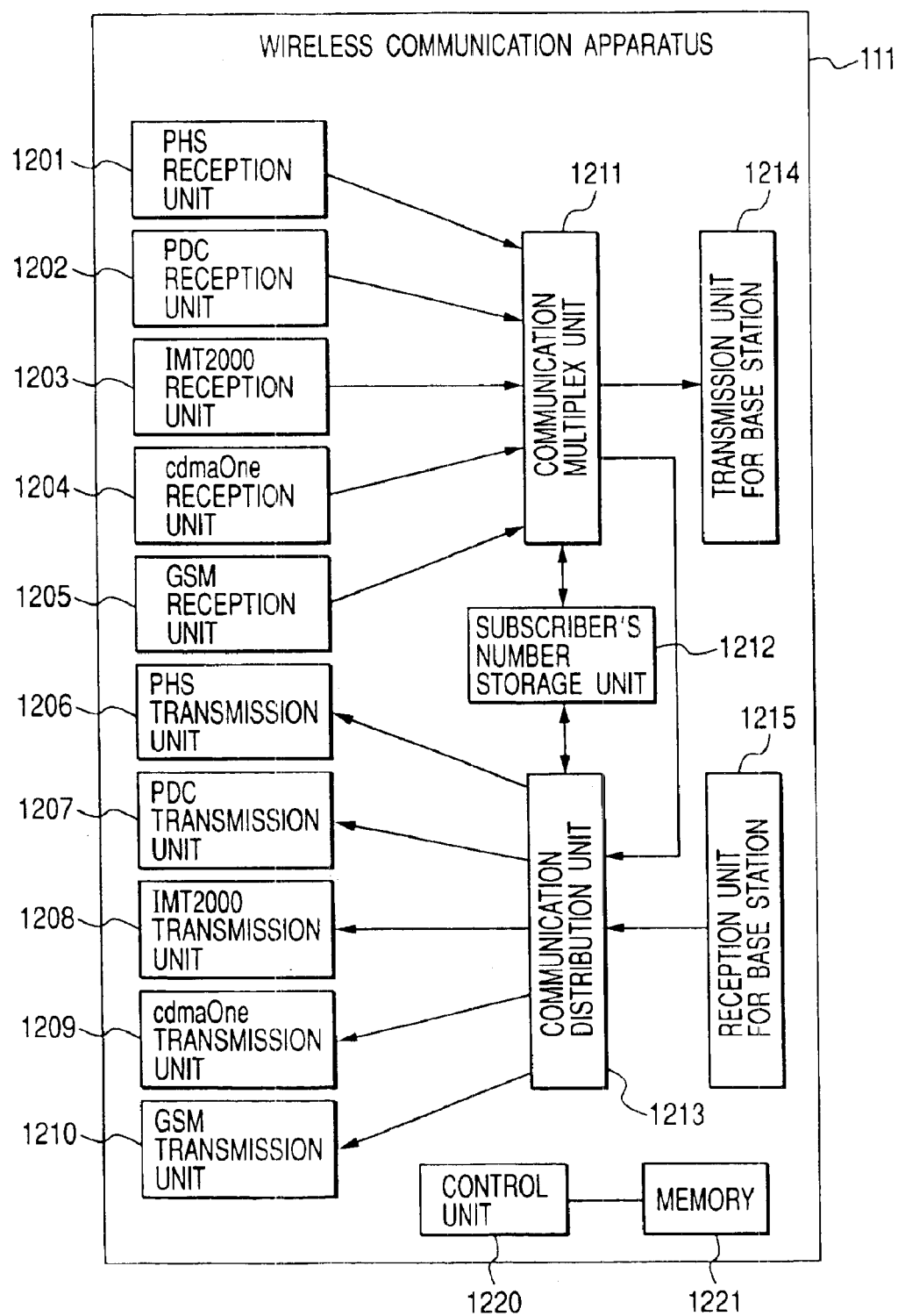
FIG. 6 is a block diagram showing an internal constitution of the wireless communication apparatus.

FIG. 6 is a block diagram showing an internal constitution of the wireless communication apparatus (111).

The wireless communication apparatus (111) comprises a PHS reception unit (1201) which receives a signal from the cellular phone (101), a PDC reception unit (1202) which receives a signal from the cellular phone (102), an IMT 2000 reception unit (1203) which receives a signal from the cellular phone (103), a cdmaOne reception unit (1204) which receives a signal from the cellular phone (104) and a GSM reception unit (1205) which receives a signal from the cellular phone (105).

Further, the wireless communication apparatus (111) comprises a PHS transmission unit (1206) which transmits a signal to the cellular phone (101), a PDC transmission unit (1207) which transmits a signal to the cellular phone (102), an IMT 2000 transmission unit (1208) which transmits a signal to the cellular phone (103), a cdmaOne transmission unit (1209) which transmits a signal to the cellular phone (104) and a GSM transmission unit (1210) which transmits a signal to the cellular phone (105).

Figure 1:
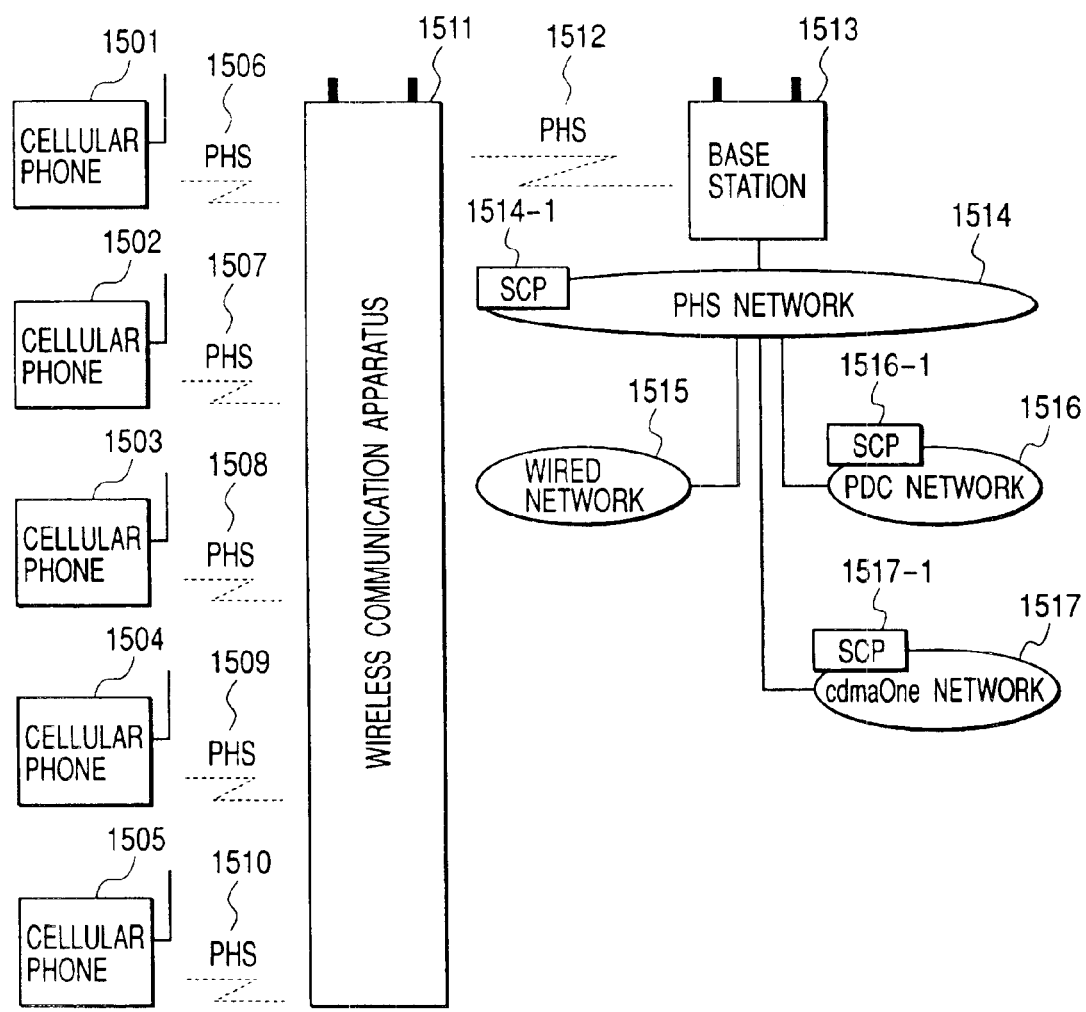
FIG. 1 is a view showing the constitution of the conventional PHS cellular phone system.

The PHS reception unit (1201) and the PDC transmission unit (1207) performs a reception and a transmission of the PHS signal by its own mode of the PHS. Note that the PHS reception unit (1201) and the PHS transmission unit (1207) have the same function as the function of receiving and transmitting the PHS signal which the wireless communication apparatus 1511 as shown in FIG. 1 performs between the cellular phones (1501 to 1505).

The PDC reception unit (1202) and the PDC transmission unit (1207) have the same function as the function of receiving and transmitting the PDC signal of a PDC public base station (for example, 117-2 of FIG. 5). The IMT 2000 reception unit (1203), the IMT 2000 transmission unit (1208), the cdmaOne reception unit (1204), the cdmaOne transmission unit (1208), the GMS reception unit (1205) and the GMS transmission unit (1210) have also the same function as the function of receiving and transmitting the IMT2000 signals of the IMT 2000, the cdmaOne and a GMS public base station (for example, 113, 116-2 and 118-2 of FIG. 5), a cdmaOne signal and a GMS signal.

Further, the wireless communication apparatus (111) comprises a communication multiplex unit (1211), a subscriber's number storage unit (1212), a communication distribution unit (1213), a transmission unit for the base station (1214) and a reception unit for the base station (1215).

The communication multiplex unit (1211) converts a transmission data transmitted respectively from the cellular phones (101 to 105) into a packet of an IMT 2000 system added with the subscriber's number at a header portion and performs the multiplexing of the packet.

The subscriber's number storage unit (1212) stores the subscriber's number of the cellular phone concerning the communication at the time when a communication starts.

The communication distribution unit (1213) distributes the packet received from the base station (113) to the corresponding cellular phone based on the subscriber's number added with the header.

The transmission unit for the base station (1214) and the reception unit for the base station (1215) perform a wireless communication with the base station (113) by using the IMT2000 (112).

The transmission unit for the base station (1214), the reception unit for the base station (1215) have the same function as the function of receiving and transmitting the signal of the IMT 2000 at least similar to the mobile machine (for example, the cellular phone 103 of FIG. 5) of the IMT 2000.

Reference numeral 1220 denotes a control unit for controlling the whole of the wireless communication apparatus (111) such as the transmission unit such as the communication multiplex unit (1211), the communication distribution unit (1213), the transmission unit for the base station (1214), the PHS transmission unit (1206) and the like based on the signal which the reception unit such as the reception unit for the base station (1215), the PHS reception unit (1210) receive, and reference numeral 1221 denotes a memory which stores a program of the control unit (1220). The control unit (1220) is a computer, and the memory (1221) is a storage medium which stores the program of the control unit (1220) in such a manner that the control unit (1220) can read it. With respect to the form of supplying the program of the control unit (1220) to the control unit (1220) from an outside storage medium not shown such as a floppy disk, CD-ROM and the like, the outside storage medium such as the floppy disk, CD-ROM and the like is equivalent to a storage medium which stores the program of the control unit (1220) in such a manner that the control unit (1220) can read it. Further, the program of the control unit (1220) may be supplied to the control unit (1220) from the reception unit for the base station (1215), the PHS reception unit (1201) and the like.

Figure 7:
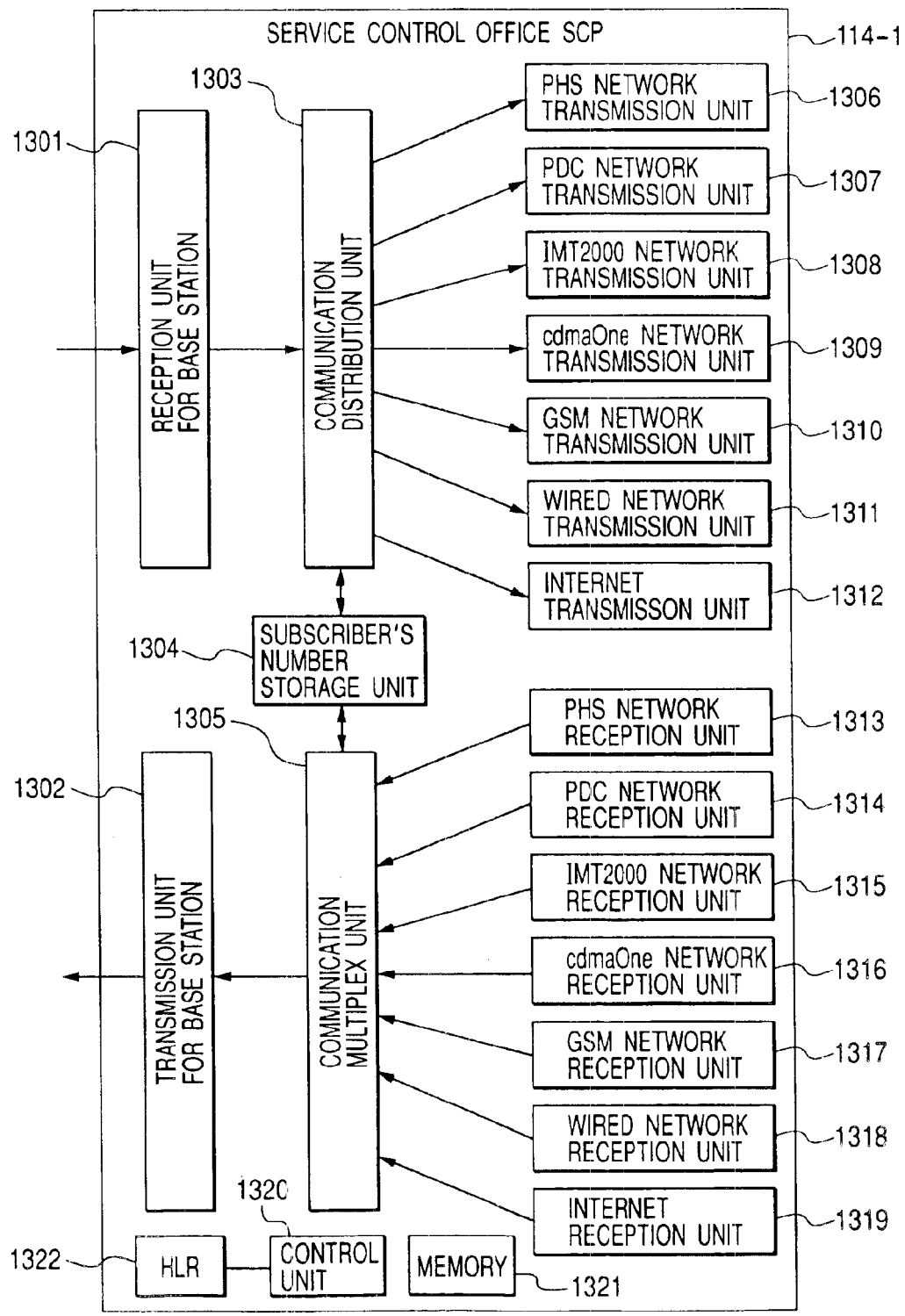
FIG. 7 is a block diagram showing the internal constitution of a service control office SCP of an IMT 2000 network.

FIG. 7 is a block diagram showing the internal constitution of the service control office SCO (114-1) of the IMT 2000 network (114).

The service control office SCP (114-1) is constituted by a reception unit for the base station (1301), a transmission unit for the base station (1302), a communication distribution unit (1303), a subscriber's number storage unit (1304), a communication multiplex unit (1305), each type of network transmission units (1306 to 1312) and each type of network reception units (1313 to 1319).

The reception unit for the base station (1301) and the transmission unit for the base station (1302) perform a wireless communication with the base station (113). The communication distribution unit (1303) distributes the packet transmitted from the wireless communication apparatus (111) to the corresponding communication network by deducing the communication network to which a communication partner of the cellular phones (101 to 105) belongs based on the subscriber' number added with its header.

The subscriber's number storage unit (1304) stores the subscriber's number of the cellular phone concerning the communication when a communication starts.

The communication multiplex unit (1305) converts transmission information toward the cellular phones (101 to 105) received from each mobile communication network, the wired network into the packet of the IMT2000 system added with the subscriber's number on its header and performs the multiplexing of it.

Each type of network transmission units (1306 to 1312) and each type of network reception units (1313 to 1319) performs a wired communication with each mobile communication network, the wired network.

Reference numeral 1320 denotes a control unit for controlling the whole of the service control office (SCP 114-1)

such as the transmission unit such as the communication multiplex unit (1305), the communication distribution unit (1303), the transmission unit for the base station (1302), the PHS network transmission unit (1306) based on the signal received by the reception unit such as the transmission unit for the base station (1302) or the PHS network reception unit (1313), and reference numeral 1321 denotes is a memory which stores a program of the control unit (1321). The control unit (1320) is a computer, and the memory (1321) is a storage medium which stores the program of the control unit (1320) in such a manner that the control unit (1320) can read it. With respect to the form of supplying the program of the control unit (1320) to the control unit (1320) from an external storage medium not shown such as a floppy disk, CD-ROM and the like, the external storage medium such as the floppy disk, CD-ROM and the like is equivalent to a storage medium which stores the program of the control unit (1320) in such a manner that the program of the control unit (1320) may be read by the control unit (1320). Further, the program of the control unit (1320) may be supplied to the control unit (1320) from the reception unit for the base station (1315), the PHS reception unit (1301) and the like.

Reference numeral 1322 denotes a HLR (Home Location Register).

Figure 8:
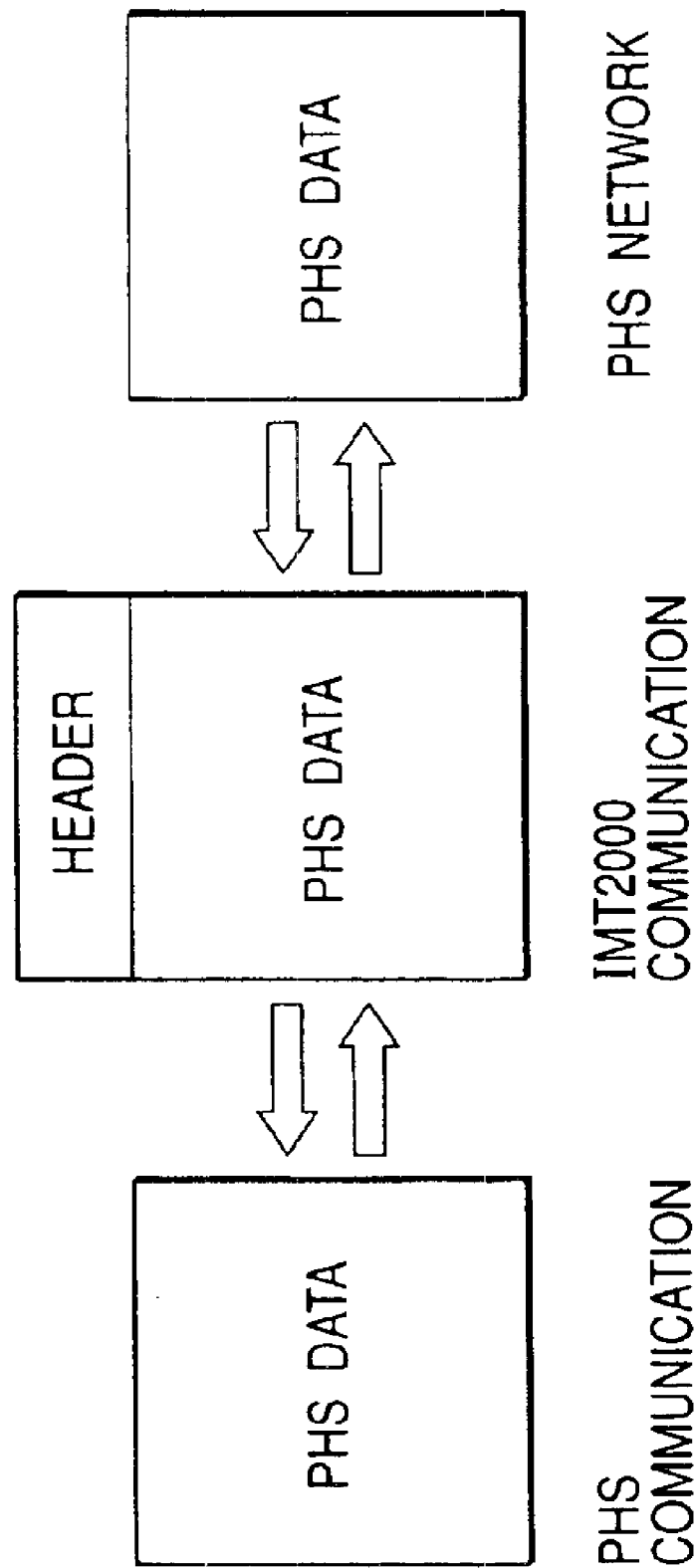
FIG. 8 is a view showing how a control data changes when the cellular phone using the PHS performs a communication with the PHS network through the IMT 2000.

FIG. 8 is a view showing how a control data changes when the cellular phone (101) using the PHS (106) performs a communication with the PHS network (115) through the IMT2000 (112).

A PHS wireless data of the cellular phone (101) is added with a header in the wireless communication apparatus (111) by the communication multiplex unit (1211) and converted to a data form on the IMT2000 (112) and transmitted to the base station (113). The data which was converted to the data form on the IMT2000 is transmitted from the base station (113) to the IMT2000 network (114) and, with its header portion removed by the communication distribution unit (1301) in the IMT2000 network (114), transmitted to the PHS network (115) in s data form of the PHS.

Similarly, even when the cellular phone using another type of the wireless communication system starts the wireless communication, the data on the IMT2000 (112) is added with a header. However, in the case of the cellular phone (108) using an IMT2000 (108), the wireless communication apparatus (111) does not add the header.

The practical procedure of a wireless communication speed increase and decrease process performed by the wireless communication apparatus (111) of the present embodiment will be described.

First, for example, when the cellular phone (101) using the PHS (106) requests for 64 Kbps as a communication speed, assuming that the communication speed required for the transmission of a header portion is 16 Kbps, the communication speed required for the IMT2000 (112) is at least 80 Kbps. Here, assuming that a basic communication speed which the IMT2000 (112) can increase and decrease is 32 Kbps, the wireless communication apparatus (111) allows an absolute minimum value 96 Kbps which is multiples of its basic communication speed and above 80 Kbps to increase and decrease according to the call out and the disconnection of the cellular phone (101) using the PHS (106).

Further, for example, when the cellular phone (101) using the PHS (106) requests for 128 Kbps as the communication speed, assuming that the communication speed required for the transmission of the header portion is 32 Kbps, the wireless communication apparatus (111) allows 160 Kbps (=32 Kpbs×5) to increase and decrease according to the call out and the disconnection of the cellular phone (101) using the PHS (106).

In this way, according to the present communication speed control process, for example, when the cellular phone (101) using the PHS (106) newly makes a call out, if a wireless link is previously established in the IMT2000 (112), the communication speed is increased in order to secure the communication speed exclusive for the call out of the cellular phone, and when the cellular phone (101) is disconnected, the communication speed increased at the calling time of the cellular phone (101) is decreased to restore its normal speed.

Note here that, while the increase and the decrease of the communication speed have been described with the cellular phone (101) using the PHS (106) as an example, the same can be said of the cellular phones (102 to 105) of another wireless communication system.

Figure 9:
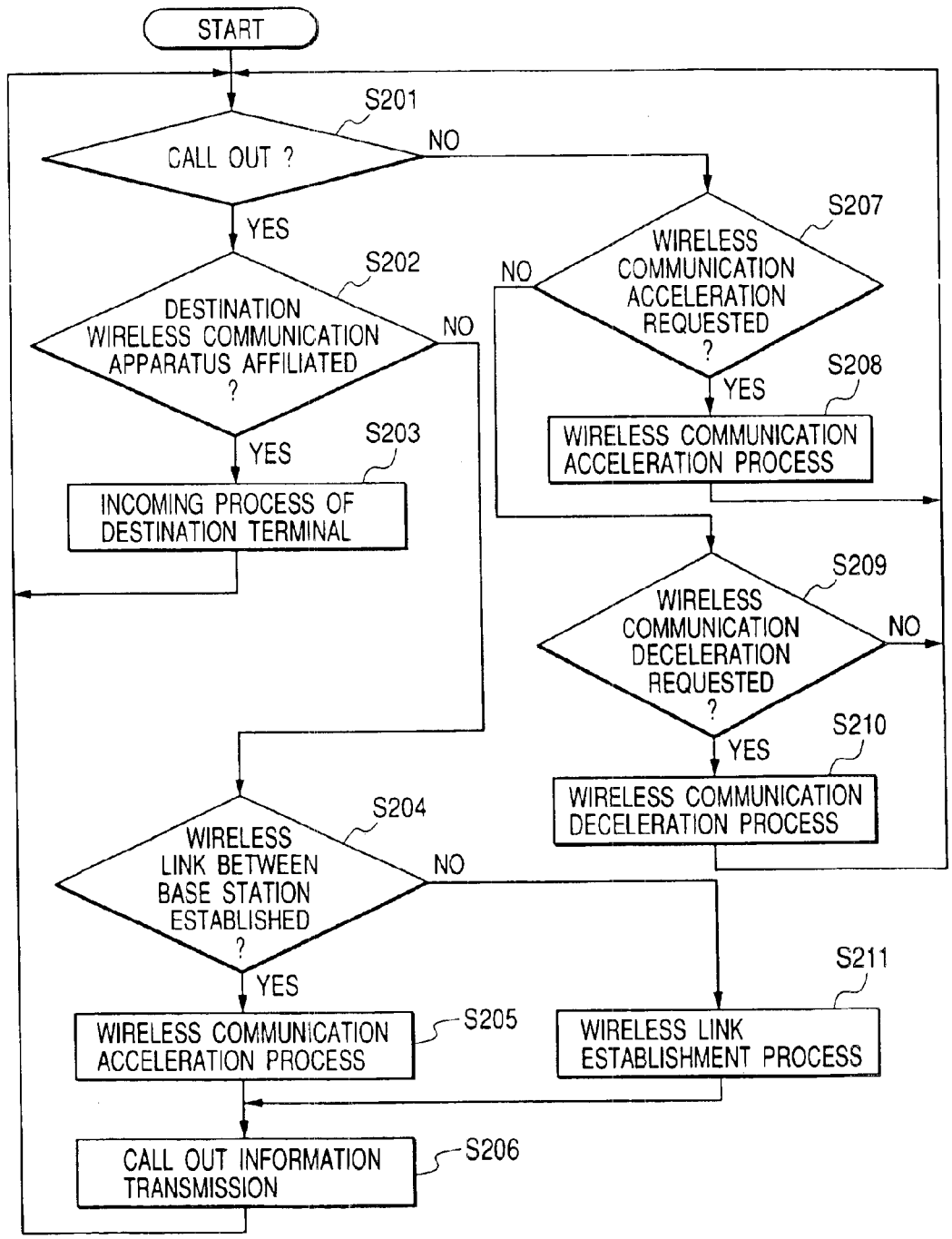
FIG. 9 is a flowchart showing a call out procedure performed in the wireless communication apparatus of the wireless communication system.

FIG. 9 is a flowchart showing the procedure of a call out process performed in the wireless communication apparatus (111) of the above described wireless communication system. The wireless communication apparatus (111) performs the following operation under the control of the control unit (1220). FIG. 9 shows a part of the program of the control unit (1220) stored in the memory (1221).

In FIG. 9, it is determined whether a call out has been made from any of the affiliated cellular phones (101 to 105) (S201) and, when determined that the call out has been made, the wireless communication apparatus (111) determines (S202) whether the destination terminal is any of the affiliated cellular phones (101 to 105). This determination is made from a destination terminal number included in the call out signal from a call out cellular phone. Here, the number of the call out cellular phone and the destination terminal number are stored in the subscriber's number storage unit (1212). When the destination terminal is any of the affiliated cellular phones (101 to 105), an incoming process is performed on the destination cellular phone within the cellular phones (101 to 105) by using the wireless communication means used by the cellular phone (S203).

When the destination terminal is neither of the cellular phones (101 to 105), it is determined (S204) whether a wireless link is previously established between the wireless communication apparatus (111) and the base station (113). A state of the wireless link among the transmission unit for the base station (1214), the reception unit for the base station (1215) and the base station (113) is stored in the memory (1221), and the determination in the step of S204 is made by referring to the memory (1221).

When the wireless link with the base station (113) is established, the wireless communication apparatus (111) performs a wireless communication speed increase process (S205) with the base station (113) by using the transmission unit for the base station (1214) and, after that, notifies (S206) to the IMT 2000 network (114) of call information such as dial information and the like. The wireless communication speed required in S205 is decided based on the wireless communication speed required in the call out signal from the call out cellular phone. The wireless communication apparatus (111) stores the communication speed of this communication in the memory (1221).

In a step S206, when there is made a call out from outside system which is connected to the IMT2000 network (114) side through the IMT2000 (112), the base station (113), at first, the wireless communication apparatus (111) calculates a communication speed newly required on the IMT2000 (112) in order to realize a speech of the cellular phone which makes a request for a call out. Note that, from the communication speed requested by the call out cellular phone which makes the request for the call out and the communication speed of the overhead portion required when the control data from the cellular phone is transmitted on the IMT2000 (112), the communication speed to be increased in the speech of the call out is calculated.

Next, in the step S205, an increase process of the wireless communication speed on the wireless link established between the wireless communication apparatus (111) and the base station (113) is performed only for the calculated communication speed. Note that in another embodiment, as described later, the wireless communication speed is increased gradually (discreetly).

On the other hand, in the step S204, when the wireless link is not yet established, the wireless communication apparatus (111) establishes (S211) a new wireless link between it and the base station (113) and notifies the IMT2000 network (114) of call information such as dial information and the like (S206). Note that, in a step S211, the communication speed is secured only for a necessary communication speed. The wireless communication apparatus (111) stores the communication speed of this communication in the memory (1211).

In the step S201, when it is determined that there is made no call out, it is determined (S207) whether a wireless communication speed increase request is made from the cellular phone during speech within the affiliated cellular phones (101 to 105). When the wireless communication speed increase request is received from the reception unit (1201 to 1205), if a partner destination of the cellular phone which made this request is not the cellular phone affiliated to the wireless communication apparatus (111), the wireless communication apparatus (111) performs the wireless communication speed increase process (S208) between it and the base station (113) by using the transmission unit for the base station (1214). The wireless communication apparatus (111) stores the communication speed after the increase in the memory (1211).

The partner destination of the affiliated cellular phone (101 to 105) is stored in the subscriber's number storage unit (1212), and whether the partner destination of the cellular phone, which has made this request, is the cellular phone affiliated to the wireless communication apparatus (111) can be determined by referring to the subscriber's number storage unit (1212).

Note that, when the partner destination of the cellular phone, which has made this request, is the affiliated cellular phone (101 to 105), the wireless communication apparatus (111) performs the wireless communication speed increase process with the cellular phone (101 to 105) of this partner destination by using the corresponding transmission unit (1206 to 1210).

When there is made no wireless communication speed increase request, it is determined (S209) whether there is made a wireless communication speed decrease request from the cellular phone during speech within the affiliated cellular phones (101 to 105). When the wireless communication speed decrease request is received from the reception unit (1201 to 1205), if the partner destination of the cellular phone, which has made this request, is not the cellular phone affiliated to the wireless communication apparatus (111), the wireless communication apparatus (111) performs a wireless communication speed decrease process (S210) between it and the base station (113) by using the transmission unit for the base station (1214). The wireless communication apparatus (111) stores the communication speed after the increase in the memory (1221).

The partner destination of the affiliated cellular phone (101 to 105) is stored in the subscriber' number storage unit (1212), and whether the partner destination of the cellular phone, which has made this request, is the cellular phone affiliated to the wireless communication apparatus (111) can be determined by referring to the subscriber's number storage unit (1212).

Note that when the partner destination of the cellular phone, which has made this request, is the cellular phone (101 to 105) affiliated to the wireless communication apparatus (111), the wireless communication apparatus (111) performs the wireless communication speed decrease process with the cellular phone (101 to 105) of this partner destination by using the corresponding transmission unit (1206 to 1210).

Figure 10:
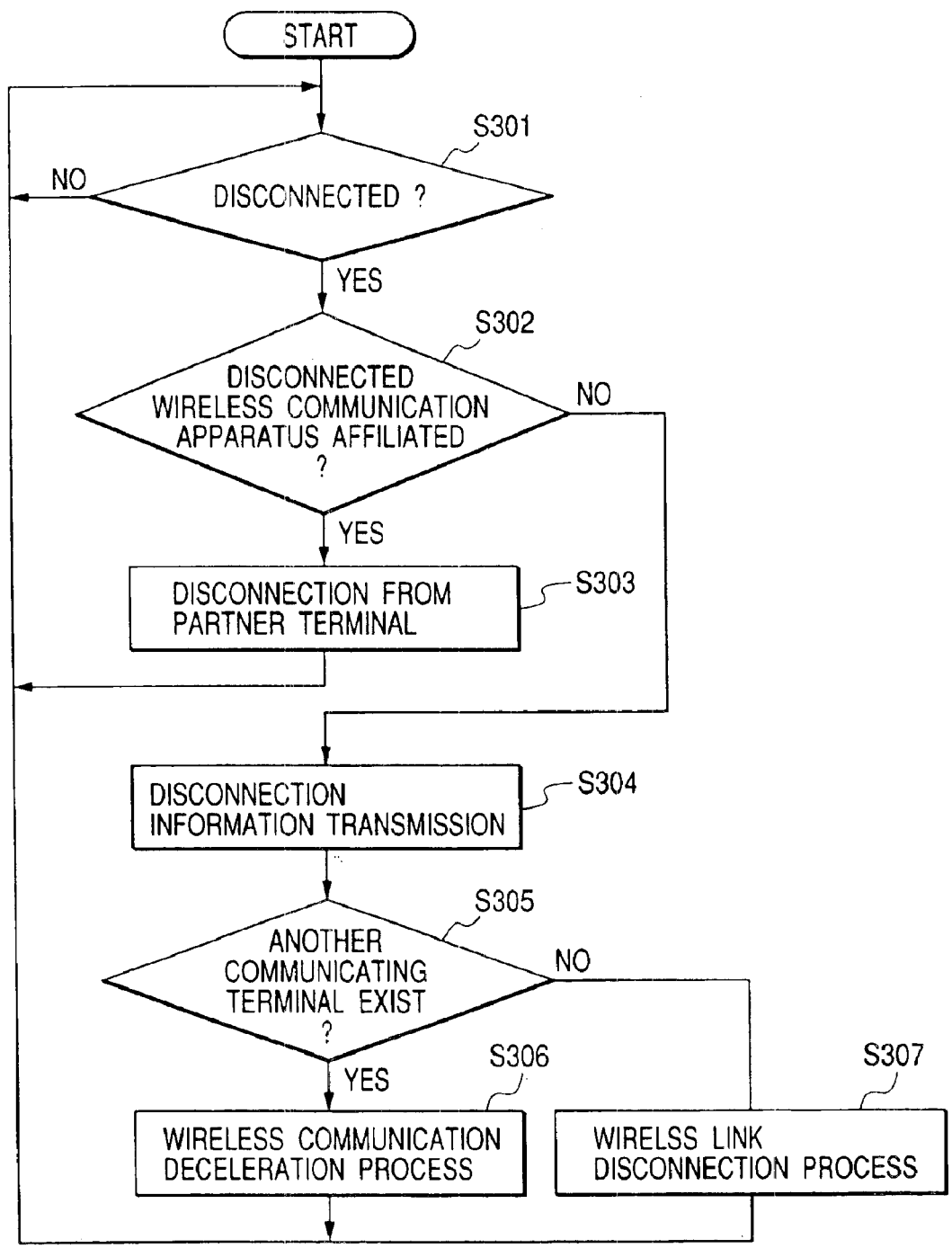
FIG. 10 is a flowchart showing a disconnection procedure performed in the wireless communication apparatus of the wireless communication system.

FIG. 10 is a flowchart showing the procedure of a disconnection process performed in the wireless communication apparatus (111) of the above described wireless communication system. The wireless communication apparatus (111) performs the following operation under the control of the control unit (1220). FIG. 10 shows a part of the program of the control unit (1220) stored in the memory (1221).

In FIG. 10, when a disconnection operation is performed (S301) in the cellular phone during speech within the cellular phones (101 to 105), it is determined (S302) whether the partner destination is any of the affiliated cellular phones (101 to 105). The partner destination of the affiliated cellular phone (101 to 105) is stored in the subscriber' number storage unit (1212), and whether the partner destination of the cellular phone for which the disconnection operation has been performed is the cellular phone affiliated to the wireless communication apparatus (111) can be determined by referring to the subscriber's number storage unit (1212).

When the partner destination is any of the affiliated cellular phones (101 to 105), the disconnection process is performed with the cellular phone of the partner destination (S303). Otherwise, that is, when the cellular phone during speech through the base station (113) within the cellular phones (101 to 105) performs the disconnection operation, it notifies to the IMT2000 network (114) of the disconnection information (S304).

On this occasion, it is determined whether there exists within the cellular phones (101 to 105) any other cellular phone during speech by using the same wireless link apart from the cellular phone on which the disconnection operation was performed (S305). A state of the wireless link among the transmission unit for the base station (1214), the reception unit for the base station (1215) and the base station (113) is stored in the memory (1221), and the determination in the step of S305 is performed by referring to the memory (1221).

When there exists another cellular phone, the wireless communication apparatus (111) performs the wireless communication speed decrease process between it and the base station (113) by using the transmission unit for the base station (1214) S(306). On the other hand, when there exists no other cellular phone during speech, the disconnection process between it and the base station (113) is performed (S307).

Next, a practical procedure of the wireless communication speed increase and decrease process performed by the wireless communication apparatus (111) of another embodiment of the present invention will be described.

Here, when the communication speed which can be set up at the IMT2000 (112) is 16 Kbps, 32 Kbps, 64 Kbps, 128 Kbps, 256 Kbps, 512 Kbps and 1024 Kbps, if the cellular phone (101) using the PHS (106) requests for 64 Kbps as a communication speed and the communication speed necessary for the transmission of the header portion is 16 Kbps, the communication speed necessary for the cellular phone (101) is 80 Kbps minimum.

Accordingly, the wireless communication apparatus (111) establishes a wireless link which sets up the communication speed at 128 Kbps in the IMT2000 (112) between it and the base station (113).

When such a communication state continues, in the case where, for example, the cellular phone (102) using the PDC (107) makes a call out by requesting for 28.8 Kbps as a communication speed, if the communication speed necessary for its header portion is taken as 3.2 Kbps, the communication speed necessary for both simultaneous communication of the cellular phone (101) and the cellular phone (102) is 112 Kbps (=80+28.8+3.2).

However, since the wireless link is previously stretched by 128 Kbps, the wireless communication apparatus (111) at the call out time of the cellular phone (102) using the PDC (107) does not change the communication speed of the IMT2000 (112).

When the both simultaneous communication of the cellular phone (101) and the cellular phone (102) is continued, in the case where, for example, the cellular phone (103) using the IMT2000 (108) requests for 128 Kbps and makes a call out, if the communication speed necessary for the transmission of the header portion is taken as 0 Kbps, the communication speed necessary for the simultaneous communication of the cellular phone (101), the cellular phone (102) and the cellular phone (103) is 240 Kbps (=112+128).

In this case, the wireless communication apparatus (111) re-sets the communication speed of the wireless link of the IMT2000 (112) to 256 Kbps.

Next, at the time of the simultaneous communication of the cellular phone (101), the cellular phone (102) and the cellular phone (103), for example, if the cellular phone (102) using the PDC (107) disconnects a communication, the communication speed necessary for the cellular phone (101) using the remaining PHS (106) and the cellular phone (103) using the IMT2000 (108) to continue the communication is 208 Kbps (=80+128). In this case, the communication speed of the wireless link is not changed.

Subsequently, for example, when the cellular phone (101) using the PHS (106) disconnects a communication, the communication speed necessary for the cellular phone (103) using the remaining IMT2000 (108) to continue the communication is 128 Kbps.

In this case, the wireless communication apparatus (111) re-sets the communication speed of the wireless link to 128 Kbps.

Note that when the cellular phone (103) using the IMT2000 is disconnected, the wireless link is also disconnected.

Figure 11:
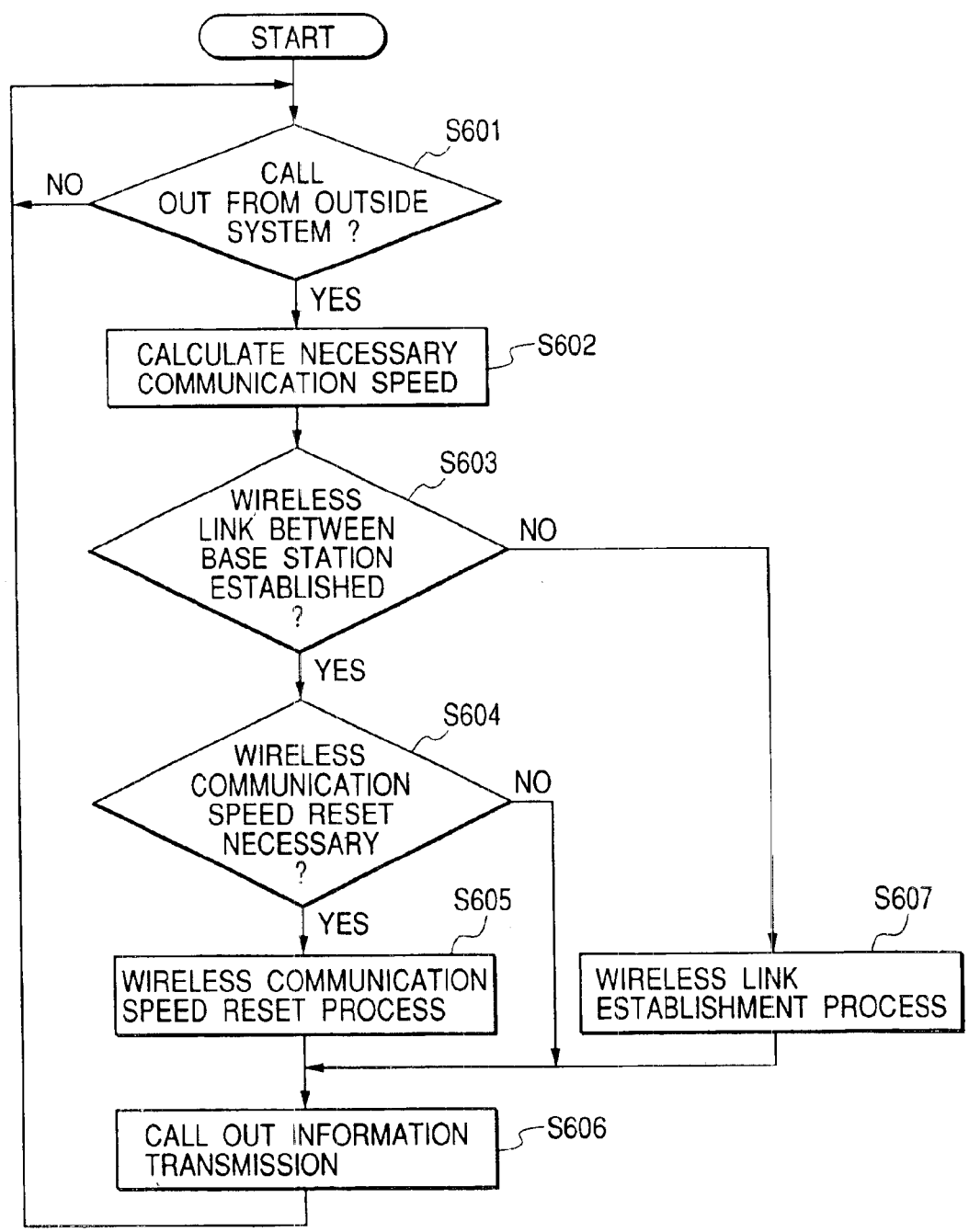
FIG. 11 is a flowchart showing a communication speed control process at a call out time performed in the wireless communication apparatus, particularly the communication speed control process at the time when a plurality of cellular phones is simultaneously during speech.

FIG. 11 is a flowchart showing the communication speed control process at the time of the call out performed in the wireless communication apparatus (111) in the above described embodiment, particularly the procedure of another embodiment of the communication speed control process when a plurality of cellular phones simultaneously start speaking. The wireless communication apparatus (111) performs the following operation under the control of the control unit (1220). FIG. 11 shows a part of the program of the control unit (1220) stored in the memory (1221).

In FIG. 11, when there is made a call out from outside system from any of the cellular phones (101 to 105) (S601), the wireless communication apparatus (111) calculates the communication speed to be set up on the IMT2000 (112) (S602).

That is, it totalizes the communication speed requested by the cellular phone which has made the call out, the communication speed of the overhead portion required at the time when the control data from the cellular phone is transmitted on the IMT2000 (112) and the communication speed of the call previously communicated on the IMT2000 (112) and calculates the communication speed to be set up. Here, what is meant by the call out from outside system is a call out which is determined to be NO in S202 of FIG. 8.

It is determined (S603) whether the wireless link between the wireless communication apparatus (111) and the base station (113) is established and, if previously established, it is determined whether the communication speed calculated in the step S602 is larger than the communication speed presently set up in the established wireless link, and determined whether the communication speed is required to be re-set up (S604).

As a result of the determination of the step S604, if the communication speed is required to be re-set up, the communication speed calculated in the step S602 is re-set up on the established wireless link (S605).

On the other hand, if the communication speed calculated in the step S602 is equal to or less than the communication speed presently set up in the established wireless link and no re-setting of the communication speed is required, advancement is made to a step S606.

In the step S603, if it is determined that the wireless link is not established between the wireless communication apparatus (111) and the base station (113), based on the communication speed calculated in the step S602, a necessary communication speed is secured to establish the wireless link (S607).

After that, the call information such as the dial information is notified to the IMT2000 network (114) (S606).

Note that, when the wireless link is established, the communication speed of the wireless link and the communication speed of the cellular phone using the wireless link are stored in the memory (1221). What is meant by the communication speed of the wireless link is any of 16 Kbps, 32 Kbps, 64 Kbps, 128 Kbps, 256 Kbps, 512 Kbps and 1024 Kbps. In the step S605, the wireless communication apparatus (111) selects one among those communication speeds of the wireless link.

Further, what is meant by the communication speed of the cellular phone is a speed which adds a necessary overhead to the communication speed requested by the cellular phone. What is meant by the communication speed which is requested by the cellular phone is that, if the cellular phone which makes a communication speed request is a PHS cellular phone (101), it is, for example, 64 Kbps and if the phone is a PDC cellular phone (107), it is, for example, 28.8 Kbps. Again, if the phone is an IMT2000 cellular phone (103), it is any of 16 Kbps, 32 Kbps, 64 Kbps, 128 Kbps, 256 Kbps, 512 Kbps and 1024 Kbps. The necessary overhead differs depending on the communication system used by the cellular phone.

Figure 12:
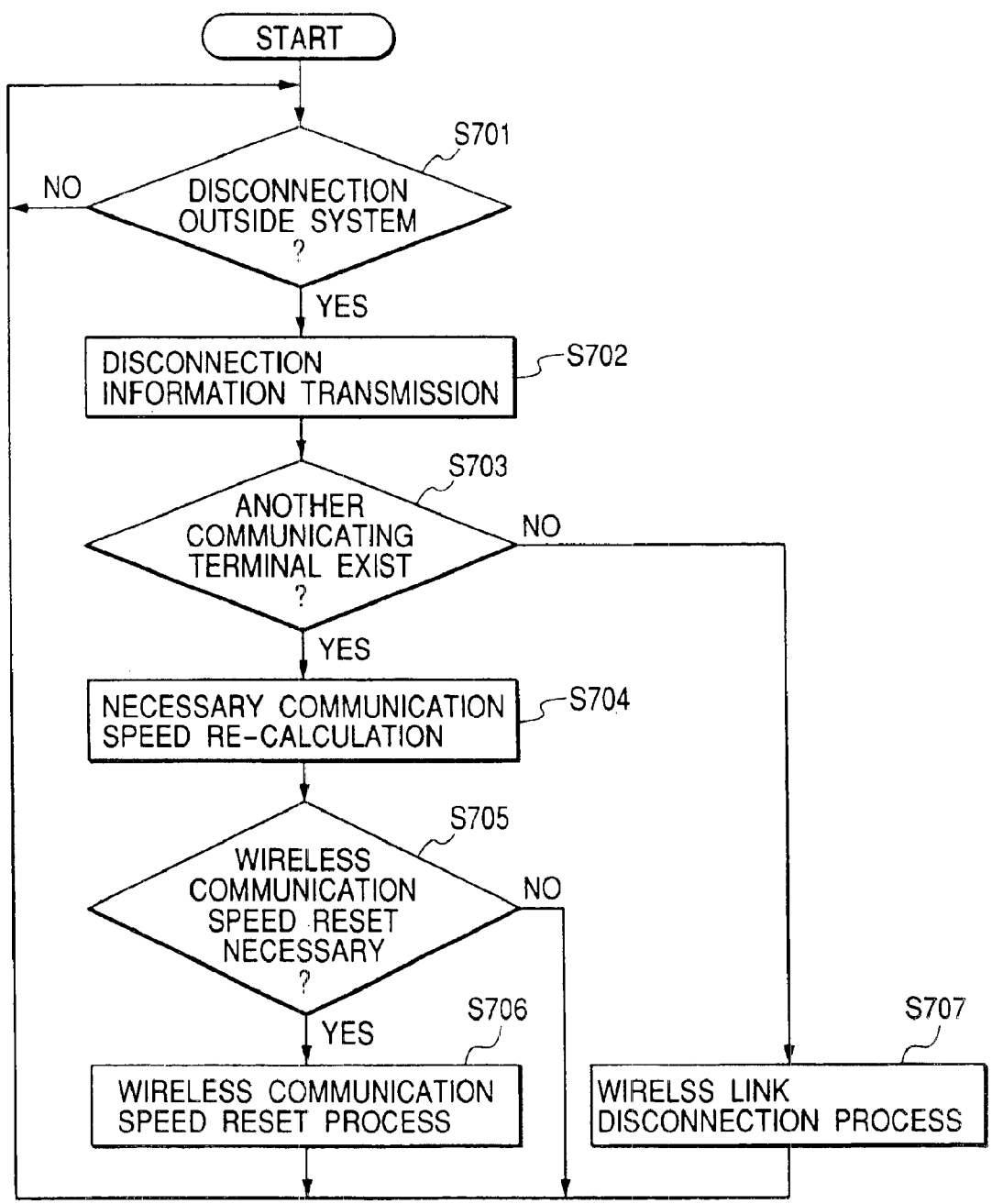
FIG. 12 is a flowchart showing the communication speed control process at a disconnection time performed in the wireless communication apparatus, particularly the communication speed control process at the time when a plurality of cellular phones is simultaneously during speech.

FIG. 12 is a flowchart showing the communication speed control process performed in the wireless communication apparatus (111), particularly the procedure of another embodiment of the communication speed control process at the time when a plurality of cellular phones simultaneously are during speech. The wireless communication apparatus (111) performs the following operation under the control of the control unit (1220). FIG. 12 shows a part of the program of the control unit (120) stored in the memory (1221).

In FIG. 12, when the cellular phone during speech through the base station (113) within the cellular phones (101 to 105) disconnects the operation (S701), the wireless communication apparatus (111) transmits the disconnection information to the IMT network (114) (S702).

It is determined (S703) whether there exists any other cellular phone during speech within the cellular phones (101 to 105) by using the same wireless link apart from the cellular phone on which the disconnection operation was performed and, if there exists any other cellular phone during speech, the communication speed necessary for the cellular phone during speech is re-calculated (S704).

It is determined (S705) whether the re-setting of reducing the wireless communication speed presently set up in the wireless link is necessary to be performed based on the wireless communication speed obtained from the re-calculation and, if determined necessary, the re-setting of the wireless communication speed is performed (S706).

In the step S703, if it is determined that there exists no other cellular phone during speech, the disconnection process of the wireless link between the wireless communication apparatus (111) and the base station (113) is performed (S707).

In this way, according to the present communication speed control process, when there exists the cellular phone which has previously performed the communication from outside system through the IMT2000 (112), the communication speed necessary for the cellular phone which has made a new call and the communication speed necessary for the cellular phone which has previously performed a communication are totalized and, based on this totalized value, the communication speed which is newly required is decided.

Accordingly, even when there is made an additional call, it is not always necessary to increase and re-set the communication speed which has been previously set up. That is, to gradually (and discretely) increase the communication speed is equivalent to an establishment of a new wireless link, and this can prevent the establishment of a useless wireless link.

Note that, while a plurality of cellular phones is during speech, when one of those phones is disconnected, the operation in a reverse direction is performed, which, after all, can prevent the establishment (the maintenance) of the useless wireless link.

Next, a location registration operation in the above wireless communication system will be described.

Figure 13:
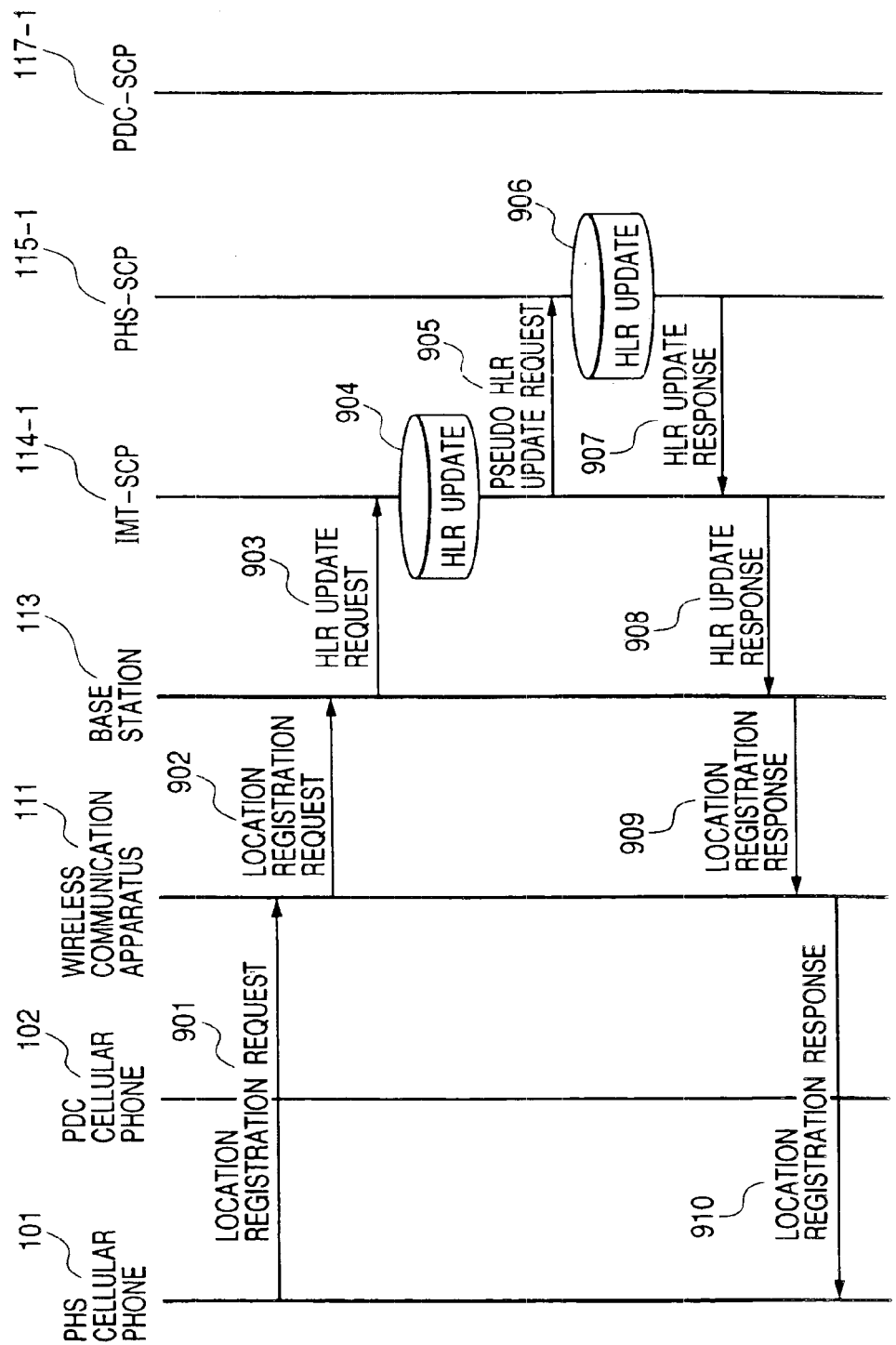
FIG. 13 is a view showing a location registration operation sequence (1/2) performed for the IMT 2000 network when, for example, a power source is set up so that the cellular phone can receive a public incoming call.
Figure 14:
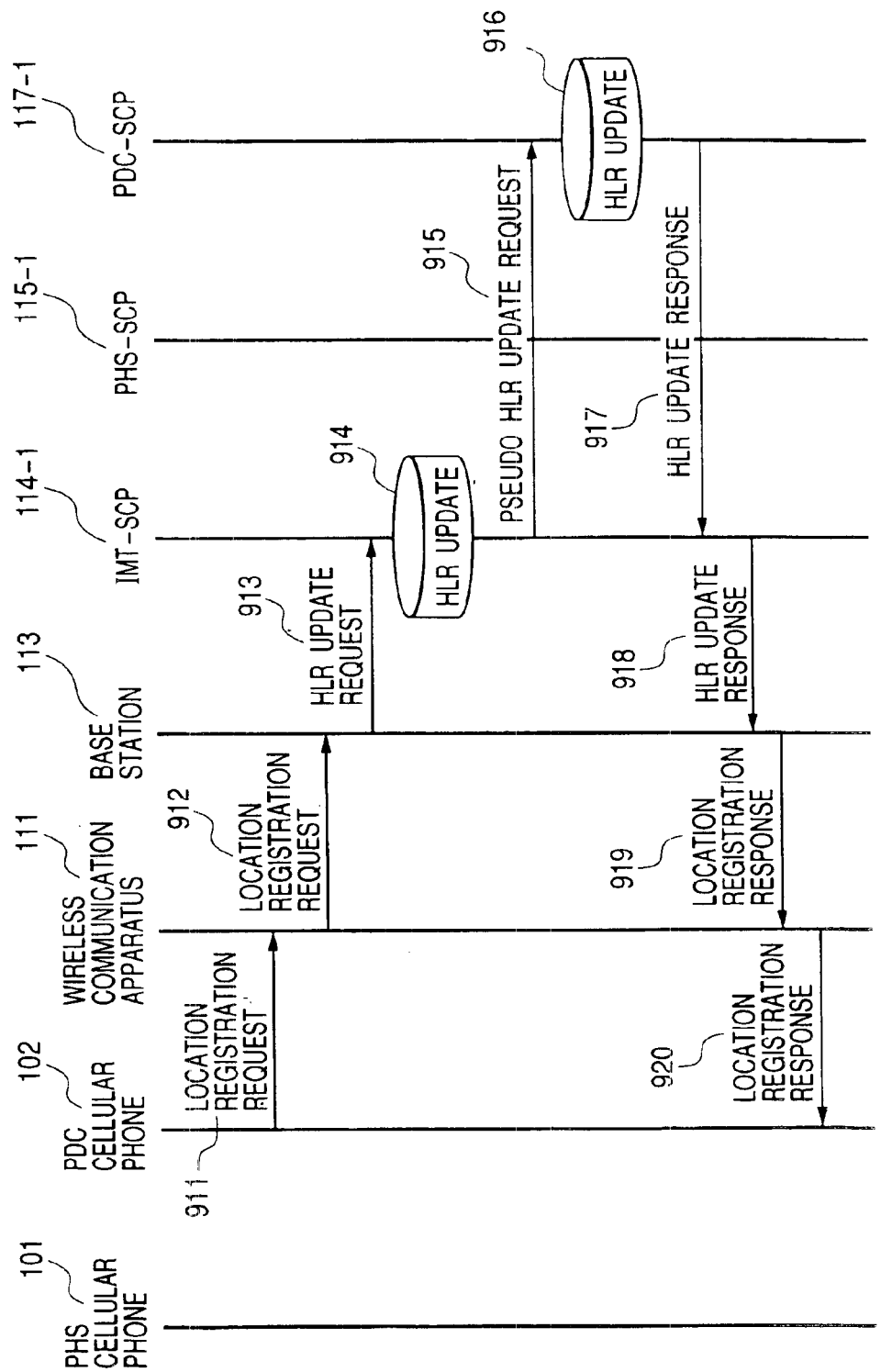
FIG. 14 is a view showing the location registration operation sequence (2/2) performed for the IMT 2000 network when a power source is set up and the like so that the cellular phone can receive a public incoming call.

FIG. 13 and FIG. 14 are views showing the location registration operation sequence performed for the IMT2000 network (114) at the time when, for example, a power source is turned on, in order to make it possible for the cellular phone (101 to 105) to receive a public incoming call.

FIG. 13 shows a location registration of the cellular phone (101) using the PHS (106), and FIG. 14 shows the location registration of the cellular phone (102) using the PDC (107).

First, the location registration of the cellular phone (101) using the PHS (106) will be described with reference to FIG. 13.

When the cellular phone (101) using the PHS (106) transmits a location registration request (901) to the wireless communication apparatus (111), the wireless communication apparatus (111) which has received it converts the radio frequency, the data format, the protocol and the like into the IMT2000 system by using the communication multiplex unit (1211) and transmits the location registration request (902) from the transmission unit for the base station (1214) to the base station (113). The location registration request (901) contains the subscriber's number of the cellular phone (101) and the location registration request contains the subscriber' number and an IMT subscriber's number of the wireless communication apparatus (111).

The base station (113), which has received this, transmits a HLR update request (903) to the service control office SCP (114-1) of the IMT2000 network (114) and requests for an update of the HLR (1322) which is a database for controlling the subscriber of the IMT2000 network (114). The HLR update request (903) contains the subscriber's number of the cellular phone (101), the IMT subscriber's number of the wireless communication apparatus (111) and a location identification number within the service area of the base station (113).

FIG. 15 is a view showing one example of the database stored in the HLR (1322) which is the database owned by the service control office SCP (114-1).

The HLR (1322) of the service control office SCP (114-1) is provided with, in addition to the HLR (1001) for use of the cellular phone of the IMT2000 network (114), the HLR (1002, 1003) corresponding to different types of the wireless communication systems.

For example, the HLR (1002) corresponding to the cellular phone of the PHS system stores the subscriber's number (1004) of the cellular phone using the PHS, the IMT subscriber's number (1005) of the wireless communication apparatus which affiliates this cellular phone under its control and the location identification number within the service area (1006) showing the location area (LA) of the base station (or one or a plurality of switching systems which accommodate the base station) in whose service area these cellular phone and the wireless communication apparatus exist.

Note that, while the HLR owned by the SCP 1514-1 of the PHS network 1514 of FIG. 1 is provided with the HLR for use of the cellular phone of the PHS network (1514) corresponding to the HLR (1001) for use of the cellular phone of the IMT2000 network (114), the HLR (1002, 1003) corresponding to the different type of the wireless communication is not provided.

In FIG. 13, the service control office SCP (114-1) of the IMT2000 network (114) which has received a transmission HLR update request (903) based on the location registration request (901) transmitted by the cellular phone (101) using the PHS (106) updates the HLR (1002) for use of the PHS terminal (904).

That is, the service control office SCP (114-1) updates the IMT subscriber's number (1005) corresponding to the subscriber's number (the subscriber's number 07012345678 in FIG. 11) of the cellular phone (101) using the PHS (106) in the HLR (1002) to the IMT subscriber's number "0903737373" of the wireless communication apparatus (111) which affiliates the cellular phone (101) under its control.

Further, the service control office SCP (114-1) updates the location identification number within the service area (1006) in the HLR (1002) to the location area (LA) "LA-3" of the base station (113) within the service area of the wireless communication apparatus (111). These subscriber's number of the cellular phone (101), the IMT subscriber's number of the wireless communication apparatus (111) and the location identification number within the service area of the base station (113) are included in the HLR update request (903).

Note that the HLR (1001) for use of the IMT2000 is registered with the location identification number within the service area LA-3 corresponding to the IMT subscriber's number "0903737373" of the wireless communication apparatus (111).

In FIG. 13, the service control office SCP (141-1) of the IMT2000 network (114) which has updated the HLR (904) transmits a pseudo HLR update request (905) from a PHS network transmission unit (1306) to a service control office SCP (151-1) of a PHS network (115) and requests for the update of a HLR (115-2) which is a database for controlling the subscriber of a PHS network (115).

Figure 2:
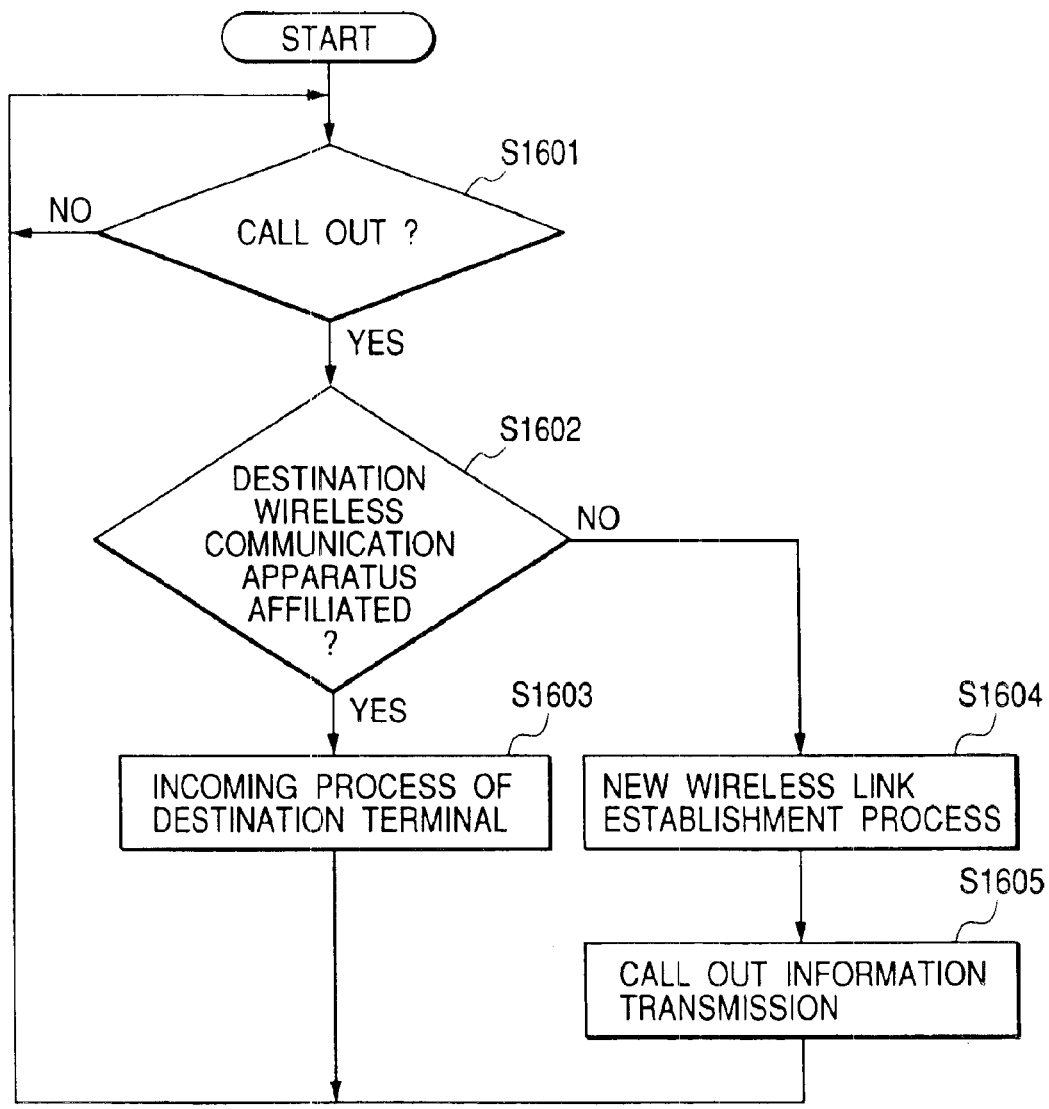
FIG. 2 is a flowchart showing a call out procedure performed in a wireless communication apparatus in the conventional PHS cellular phone system.
Figure 3:
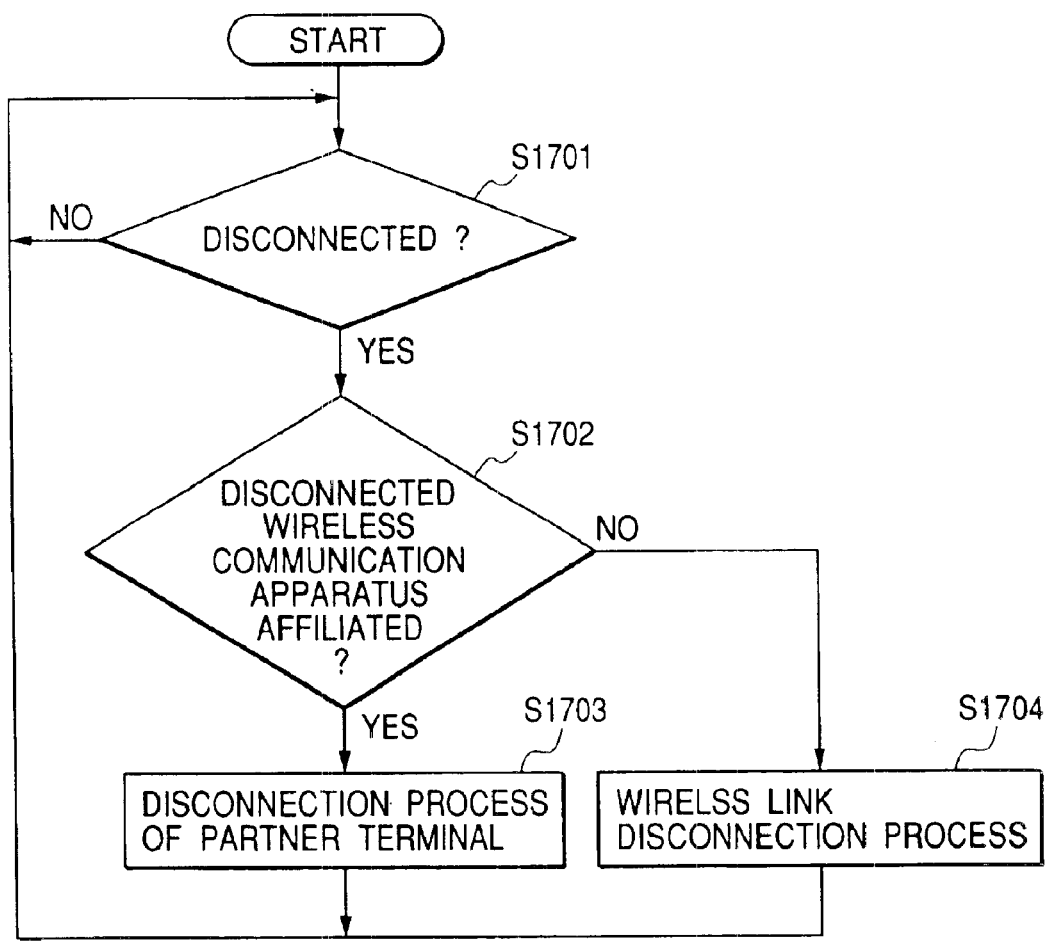
FIG. 3 is a flowchart showing a disconnection procedure performed in the wireless communication apparatus in the convention PHS cellular phone system.
Figure 4:
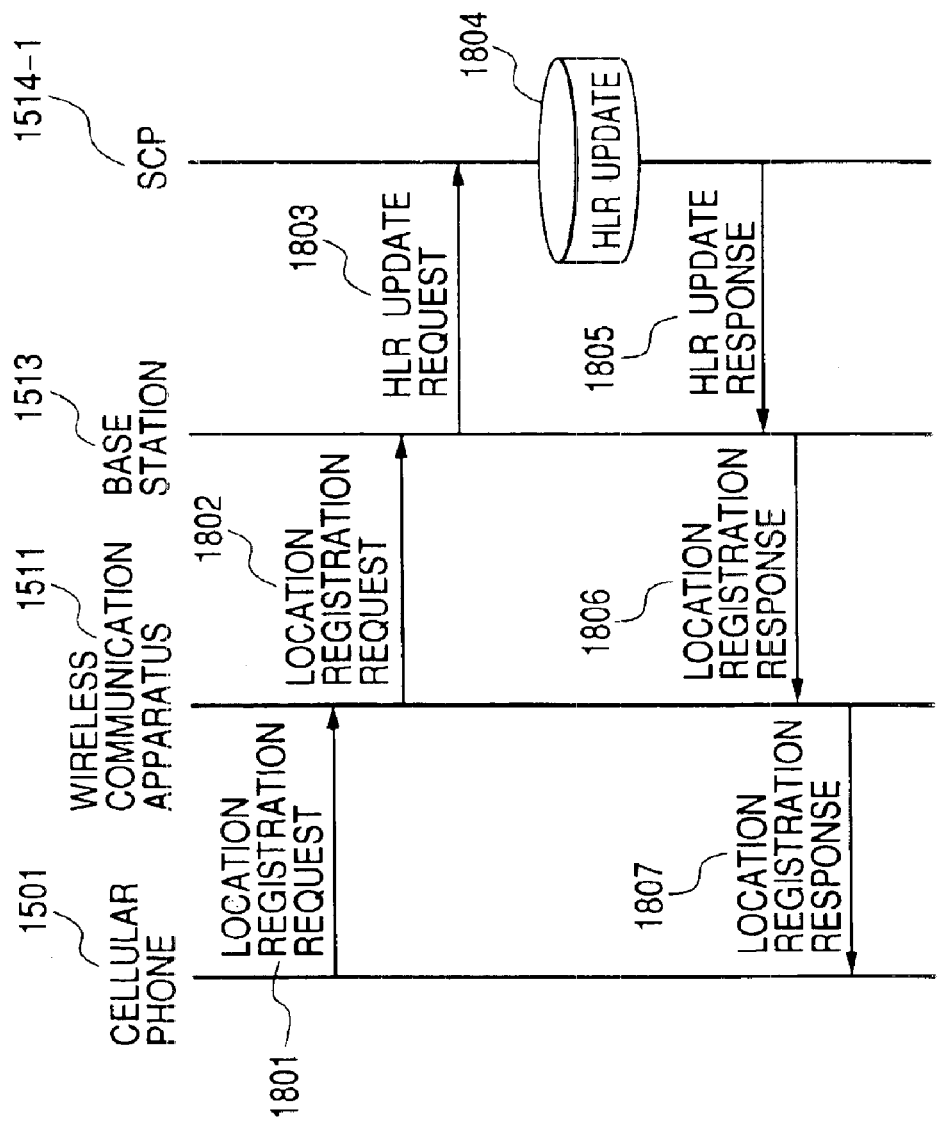
FIG. 4 is a view showing a location registration sequence in the conventional PHS cellular phone system.

This pseudo HLR update request (905) is performed, when the cellular phone using the PHS performs the location registration through a PHS wireless base station (1513 of FIG. 1 or 113 of FIG. 5), in the same procedure as the HLR update request which is transmitted to the service control SCP (1514-1 of FIG. 1 or 115-1 of FIG. 5) of the PHS network from the PHS wireless base station (1513 of FIG. 1 or 115-2 of FIG. 5). That is, the PHS network transmission unit (1306) transmits the pseudo HLR update request (905) to the service control office SCP (115-1) of the PHS network (115) in the same procedure as the HLR update request of the PHS wireless base station.

The service control office SCP (115-1) which has received the pseudo HLR update request performs the update of a HLR (115-2).

FIG. 16 is a view showing one example of the data stored in the HLR (115-2).

The HLR (115-2) is stored with a subscriber's number (1102) of the cellular phone using the PHS, an identification number within the service area (1103) used for a roaming location registration between mobile communication networks and the location identification number within the service area (1104) showing the location area (LA) of the base station (or one or a plurality of switch boards which accommodate the base station) in whose the service area the cellular phone and the wireless communication apparatus exist.

Note that the HLR owned by the SCP 1514-1 of the PHS network 1514 of FIG. 1 is also provided with a subscriber's number (1102) of the cellular phone using the PHS and the same area as an area for storing the location identification number within the service area (1104) showing the location area (LA) of the base station (or one or a plurality of switch boards which accommodate the base station) in whose service area the cellular phone and the wireless communication apparatus exist. However, the HLR owned by the SCP 1514-1 of the PHS network 1514 of FIG. 1 is not provided with the area for storing a network identification number within the service area (1103) used for the roaming location registration between the mobile communication networks.

In FIG. 13, the service control office SCP (115-1) of the PHS network (115) which has received the pseudo HLR update request (905) updates the network identification number within the service area (1103) corresponding to the cellular phone (101) (the subscriber's number 07012345678 in FIG. 12) using the PHS (106) in the HLR (115-2) to "IMT2000" showing the IMT2000 network (114) (906).

When the cellular phone using the PHS performs the location registration through the PHS wireless base station (1513 of FIG. 1 or 113 of FIG. 5), the HLR update request transmitted to the service control office SCP (1514-1 of FIG. 1 or 115-1 of FIG. 5) of the PHS network from the PHS wireless base station (1513 of FIG. 1 or 115-2 of FIG. 5) does not update the identification number within the service area (1103). The pseudo HLR update request (905) is a procedure which adds the update of the identification number within the service area (1103) to a HCR update request of the PHS wireless base station.

In this way, when the location registration normally finishes, as shown in FIG. 13, from the service control office SCP (115-1) of the PHS network (115) to the service control office SCP (114-1) of the IMT2000 network (114), a HLR update response (907) of the cellular phone (101) using the PHS (106) is transmitted.

The service control office SCP (114-1) of the IMT2000 network (114), which has received this, converts the radio frequency, the data format and the protocol into the IMT2000 system by using the communication multiplex unit (1305) and transmits a HLR update response (908) to the base station (113). The base station (113) transmits a location registration response (909) to the wireless communication unit (111). The base station (111), which has received this, converts the radio frequency, the data format, the protocol and the like into the PHS system by using the communication distribution unit (1213) and notifies to the cellular phone (101) using the PHS (106) from the PHS transmission unit (1206) of a location registration response (910), and the location registration finishes.

Next, a location registration of the cellular phone (102) using the PDC (107) will be described with reference to FIG. 14. This location registration is also the same as the location registration of the cellular phone (101) using the PHS (106).

When the cellular phone (102) using the PDC (107) transmits a location registration request (911) to the wireless communication apparatus (111), the wireless communication apparatus (111), which has received this, converts the radio frequency, the data format, the protocol and the like into the IMT2000 system and transmits a location registration request (912) to the base station (113).

The base station (113), which has received this, transmits a HLR update request (913) to the service control office SCP (114-1) of the IMT2000 network (114) and requests for a HLR update (1322) which is a database for controlling the subscriber's number of the IMT2000 network (114).

The service control office SCP (114-1) of the IMT2000 network (114) updates the IMT subscriber's number corresponding to the cellular phone (102) (the subscriber's 09087654321 in FIG. 11) using the PDC (107) in the HLR (1003) corresponding to the cellular phone of the PDC system as shown in FIG. 15 to IMT subscriber's number "0903737373" of the wireless communication apparatus which affiliates the cellular phone (102) under its control, and updates the identification number within service area to the location area (LA) "LA-3" of the base station (113) in whose service area the wireless communication apparatus (111) exists.

As shown in FIG. 14, the service control office SCP (114-1) of the IMT2000 network (114), which has updated the HLR (904), transmits a pseudo HLR update request (915) to the service control office SCP (117-1) of the PDC network (117) and requests for a HLR (117-2) update which is a database for controlling the subscriber's number of the PDC network (117). This is the same procedure as the HLR update request transmitted to the service control office SCP of the PDC network from a PDC wireless base station when the cellular phone using the PDC performs the location registration through the PDC wireless base station.

The service control office SCP (117-1) of the PCD network (117), which has received the pseudo HLR update request, performs the update (916) of the HLR (117-2).

Similar to the HLR (906) as shown in FIG. 16, the HLR (117-2) is stored with the subscriber's number of the cellular phone using the PDC, the network identification number within the service area used for the roaming location registration between the mobile communication networks and the location identification number within the service area showing the location area (LA) of the base station (or one or a plurality of switch boards which accommodates the base station) in whose service area the cellular phone and the wireless communication apparatus exist.

Accordingly, the service control office SCP (117-1) of the PDC network (117), which has received a pseudo HLR update request (915), updates the network identification number within the service area corresponding to the cellular phone (102) using the PDC (107) to "IMT2000" showing the IMT2000 network (114).

In this way, when the location registration finishes, from the service control office SCP (117-1) of the PDC network (117) to the service control office SCP (114-1) of the IMT2000 network (114), a HLR update response (917) of the cellular phone (102) using the PDC (107) is transmitted.

The service control office SCP (114-1) of the IMT2000 network (114), which has received this, converts the data format and the protocol into the IMT2000 system and transmits a HLR update response (918) to the base station (113), and the base station (113) transmits a location registration response (919) to the wireless communication apparatus (111).

The wireless communication apparatus (111), which has received this, converts the radio frequency, the data format, the protocol and the like into the PHS system and notifies to the cellular phone (102) using the PDC (107) of a location registration response (920), and the location registration finishes.

Note that when, for example, the cellular phone using another PHS which is registered in the PHS network (115) makes a call out to the cellular phone (101) using the PHS (106) which is affiliated to the wireless communication apparatus (111), the service control office SCP (115-1) of the PHS network (115) retrieves the HLR (117-2) of its own network.

As shown in FIG. 16, since the network identification number within the service area corresponding to the cellular phone (101) (the subscriber's number 07012345678) using the PHS (106) is "IMT2000" showing the IMT2000 network (114), the service control office SCP (115-1) of the PHS network (115) transmits a call out request to the service control office SCP (114-1) of the IMT2000 network (114). This call out request contains the subscriber's number (07012345678) of the cellular phone (101).

The service control office SCP (114-1) of the IMT2000 network (114), which has received this, retrieves a HLR (1322) of its own network based on the subscriber's number (07012345678) of the cellular phone (101) which is contained in the call out request.

As shown in FIG. 15, as a result of the retrieval, the location identification number within the service area "LA-3" of the service station in whose service area the cellular phone (101) (the subscriber's number 07012345678) using the PHS (106) exists and the IMT subscriber's number "0903737373" of the wireless communication apparatus (111) which affiliates the cellular phone (101) under its control are read. The service control office SCP (114-1) of the IMT2000 network (114) selects the base station (113) according to the information read in this way and reports an incoming call information to the wireless communication apparatus (111) from the base station (113). This incoming call information contains the IMT subscriber's number "0903737373" of the wireless communication apparatus (111) and the subscriber's number "07012345678" of the cellular phone (101).

The wireless communication apparatus (111) converts the radio frequency, the data format, the protocol and the like into the PHS system by using the transmission distribution unit (1213) and transmits the incoming call information of the cellular phone (101) using the PHS (106) to its own managed PHS area. This incoming call information contains the subscriber's number "07012345678" of the cellular phone (101) using the PHS (106). In this way, the cellular phone (101) using the PHS (106) can receive a public incoming call.

While, for convenience' sake, the description has been made by referring to a call out to the cellular phone (101) using the PHS (106) from the cellular phone using the PHS inside the PHS network (115), it is the same in the case of the call out to the cellular phone (101 to 105) affiliated to the wireless communication apparatus (111) from another mobile communication network or wired network and the call out to another mobile communication network or wired network from the cellular phone (101 to 105) affiliated to the wireless communication apparatus (111).

In this way, according to the above described wireless communication system, since the service control office SCP (114-1) of the IMT2000 network (114) is provided with the database (HLR) of the different wireless communication systems and the pseudo location registration is performed on the mobile communication network of the different systems in correspondence with the wireless communication system of the wireless communication terminal (the cellular phone), a plurality of wireless communication terminals of different systems such as the internal cellular phone (101 to 105) accommodated by the wireless communication apparatus (111) can receive the public incoming call as the mobile terminals of the public mobile communication network.

Note that, while the above described embodiment simplifies the description of the location registration request, the location registration response and the incoming call, in reality, the general location registration procedure or incoming procedure have to be observed. That is, though not shown, a certifying procedure, a secret designation procedure and the like are included. Further, for simplicity of the description, though the location registration procedure and the radio transmission relating to the incoming call and the establishment procedure of a wired communication channel have been omitted, in reality, these have to follow the procedure in correspondence with each communication system.

Figure 17:
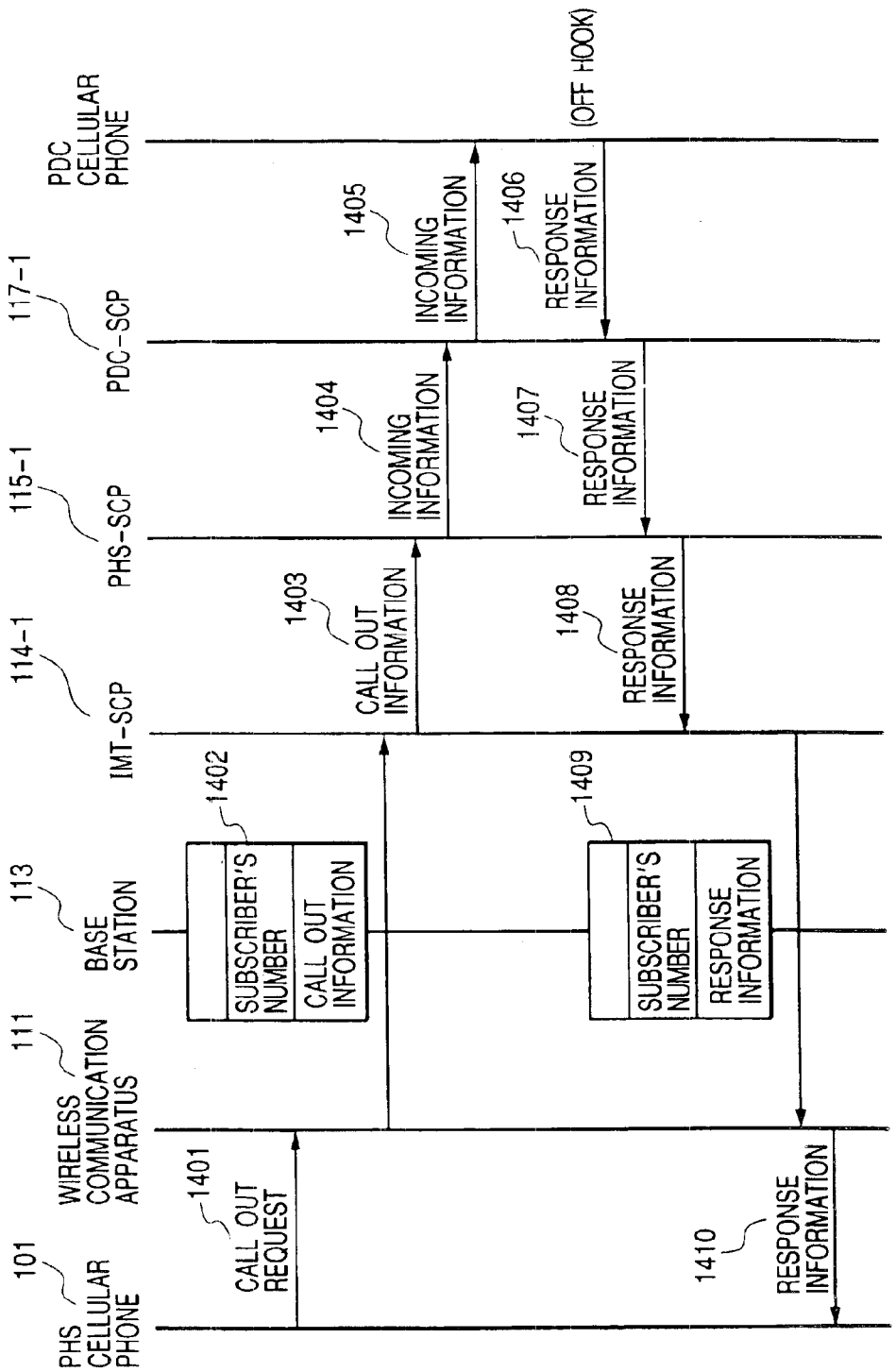
FIG. 17 is a sequence view showing an information flow at the time when the cellular phone using the PHS makes a call out to the cellular phone inside the PDC network.

FIG. 17 is a sequence view showing the flow of information when the cellular phone (101) using the PHS (106) makes a call out to the cellular phone inside the PDC network (117).

In FIG. 17, when the cellular phone (101) using the PHS (106) transmits a call out request (1401) to the wireless communication apparatus (111), the call is established between the cellular phone (101) and the PHS reception unit (1201) of the wireless communication apparatus (111) and the PHS transmission unit (1206), and the call out information is transmitted to the communication multiplex unit (1211) of the wireless communication apparatus (111). This call out request (1401) contains the subscriber' number of the PDC cellular phone of a call out destination terminal and the subscriber's number of the PHS cellular phone (101).

In the communication multiplex unit (1211), the subscriber's number (for example, 07012345678) of the cellular phone (101) using the PHS (106) is stored in the subscriber's number storage unit (1212), and the call out information is converted to a packet form of the IMT2000 communication which is added with the subscriber's number of the PHS cellular phone (101) on the header portion and transmitted to the service control office SCP (114-1) of the IMT2000 network (114) through the base station (113) (1402). This call out information (1402) of the packet form contains the subscriber's number of the PDC cellular phone of the call out destination terminal.

In the communication distribution unit (1303) of the service control office SCP (114-1) of the IMT2000 network (114), the subscriber's number of the PHS cellular phone (101) which has been transmitted is stored in the subscriber's number storage unit (1304) and, being determined based on the subscriber's number that it is the call out from the cellular phone (101) using the PHS (106), the data is transmitted to the PHS network transmission unit (1306).

The PHS network transmission unit (1306) transmits the call out information to the service control office SCP (115-1) of the PHS network (115) in the same way as the usual PHS network base station (1513 of FIG. 1, 115-2 of FIG. 5) performs the wired communication to the service control office SCP (1514-1 of FIG. 1, 115-1 of FIG. 5) of the PHS network. This call out information (1403) contains the subscriber's number of the PDC cellular phone of the call out destination terminal.

In the service control office SCP (115-1) of the PHS network (115), based on the transmitted call out information, the incoming call information is transmitted (1404) to the service control office SCP (117-1) of the PDC network (117), and the service control office SCP (117-1) of the PDC network (117) notifies to the cellular phone using the PDC of the destination terminal of the incoming call information.

When the cellular phone using the PDC of the destination terminal responds (off hook) to the incoming call, the response information is transmitted (1406, 1407, 1408) from the cellular phone using the PDC to the service control office SCP (114-1) of the IMT2000 network (114) through the service control office SCP (117-1) of the PDC network (117) and the service control office SCP (115-1) of the PHS network (115).

In the service control office SCP (114-1) of the IMT 2000 network (114), this response information is received at the PHS network reception unit (1313), and the communication multiplex unit (1305) converts the response information into the packet form of the IMT2000 communication which is added with the subscriber's number of the cellular phone (101) using the PHS (106) on the header portion and transmits it (1409) to the wireless communication apparatus (111) through the base station (113).

In the wireless communication apparatus (111), the packet transmitted from the base station (113) is received by the reception unit for the base station (1215) and determined by the communication distribution unit (1213) based on the subscriber's number added to the header that it is the response information to the cellular phone (101) using the PHS (106), and the response information is transmitted (1410) to the cellular phone (101) using the PHS (106) through the PHS transmission unit (1206).

Subsequently, a speech data during communication is similarly transmitted between the wireless communication apparatus (111) and the service control office SCP (114-1) of the IMT2000 network (114) in the form of a packet having the subscriber's number added to the header portion thereof.

Note that, when the communication finishes, the subscriber's number of the cellular phone (101) using the PHS (106) which is stored respectively in the subscriber's number storage unit (1212) of the wireless communication apparatus (111) and in the subscriber's number storage unit (1304) of the service control SCP (114-1) of the IMT2000 network (114) is eliminated.

Note that, in the above described embodiment, while as the wireless communication means (system) between the wireless communication terminal (the cellular phones 101 to 105) and the wireless communication apparatus (111), the PHS (106), the PDC (107), the IMT2000 (108), the cdma-One (109) and the GSM (110) are enumerated, the present invention is not limited to the constitution of the above described embodiment, and the present invention can be adapted to another currently existing cellular phone communication system, the cellular phone communication system under development and the wireless communication system for use of the data communication in addition to the wireless communication system using the wireless communication system such as an amateur wireless communication, a professional wireless communication, a millimeter wave communication, an optical communication and the like.

Further, the present invention can be also adapted for the wireless communication system using the wireless communication terminal in which one set of the wireless communication terminal performs the communication by plurality of wireless communication means (systems).

Further, the wireless communication system between the wireless communication apparatus (111) and the base station (113) is not limited to the IMT2000, but may be whichever wireless communication system available provided that it is the wireless communication system capable of changing the communication speed.

Figure 18:
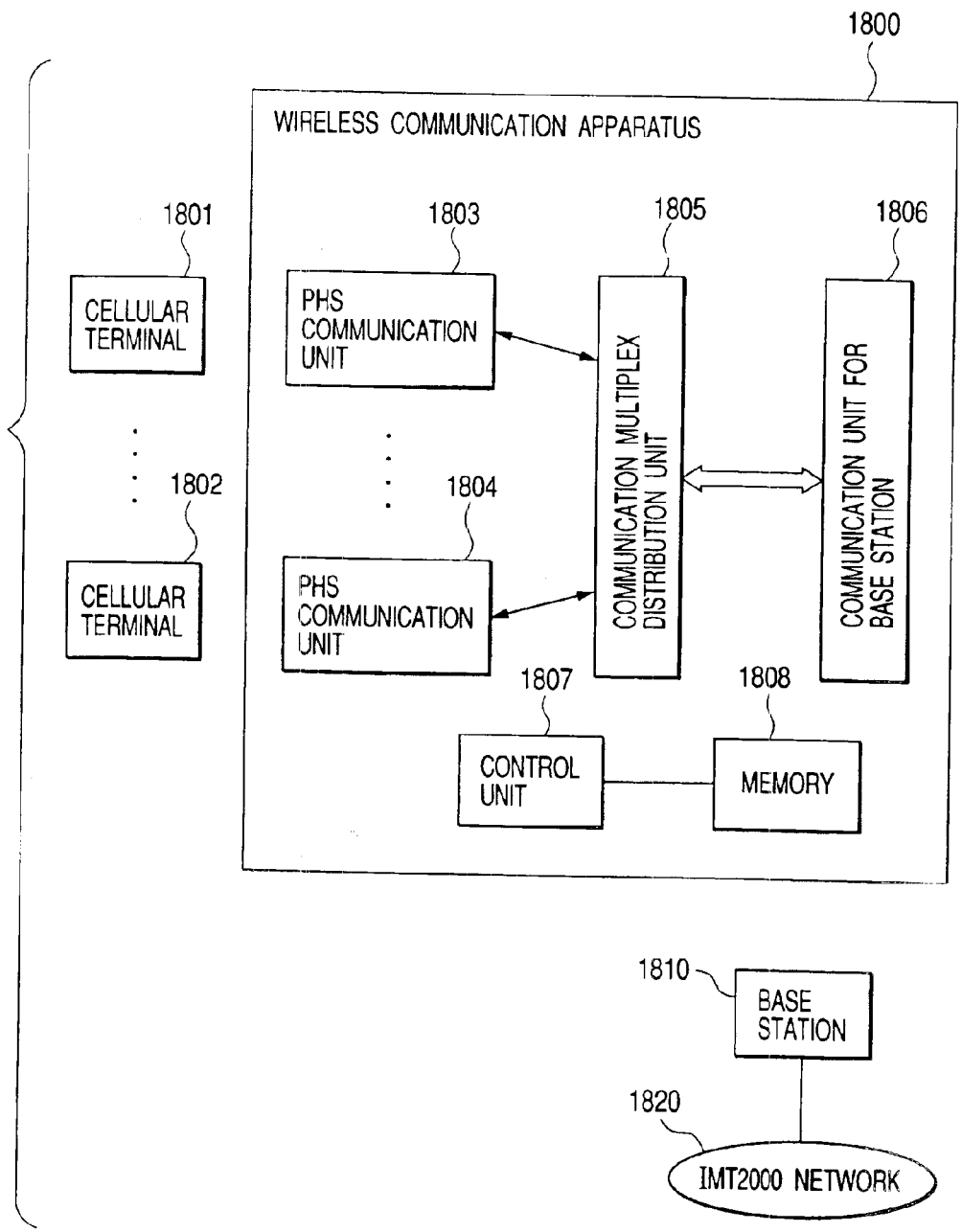
FIG. 18 is a view showing the constitution of another embodiment of the wireless communication system including the wireless communication apparatus according to the present invention.

The constitution of another embodiment of the present invention is shown in FIG. 18.

In FIG. 18, reference numeral 1800 denotes a wireless communication apparatus and reference numerals 1801, 1802 denote PHS cellular terminals.

Reference numerals 1803, 1804 are PHS communication units which perform communications with the PHS cellular terminals (1801), (1802) by its own managed mode of the PHS. In FIG. 18, while two each of the PHS cellular terminals (1801), (1802) and the PHS communication units (1803), (1804) are shown, more than three each are connected.

Reference numeral 1805 denotes a communication multiplex/distribution unit, and reference numeral 1806 a communication unit for the base station (1806). Reference numeral 1810 is a base station of an IMT2000 network (1820).

The communication unit for the base station (1806) performs a communication with the base station (1810) by the same procedure as the subscriber's terminal of the IMT2000.

Reference numeral 1807 denotes a control unit for controlling the whole of the wireless communication apparatus (1800) and reference numeral 1808 a storage unit for storing the program of the control unit (1807). The control unit (1807) is a computer, and the memory (1808) is a storage medium which stores the program of the control unit (1807) so that the control unit (1807) can read it. With respect to the form of supplying the program of the control unit (1807) to the control unit (1807) from an outside storage medium not shown such as a floppy disk, CD-ROM and the like, the outside storage medium such as the floppy disk, CD-ROM and the like is equivalent to a storage medium which stores the program of the control unit (1807) in such a manner that the control unit (1807) can read it. Further, the program of the control unit (1807) may be supplied to the control unit (1807) from the reception unit for the base station (1806), the PHS communication unit (1803) and the like.

The operation of the wireless communication apparatus (1800) will be described with reference to FIG. 11 and FIG. 12.

The wireless communication apparatus (1800) performs the following operation under the control of the control unit (1807). FIG. 11, FIG. 12 show a part of the program of the control unit (1807) stored in the memory (1808).

When the cellular terminal (1801) requests for a communication of the communication speed of 64 Kbps through the IMT2000 network (1820), the operation at the time when two cellular terminals affiliated to the wireless communication apparatus (1800) have previously been communicating at the communication speed of 64 Kbps through the communication unit for the base station (1806), the base station (1810) and the IMT2000 network (1820) will be described. Note that the memory (1808) is stored with the communication speed of the wireless link between the communication unit for the base station (1806) and the base station (1810) and the speeds of the communications which a plurality of cellular terminals (1801), (1802) have been performing.

When the PHS data is transmitted from the communication unit for the base station (1806) to the base station (1810), if the communication speed necessary for the transmission of the header is 16 Kbps, in the case where two cellular terminals perform the respective communications at the speed of 64 Kbps, the wireless link of more than 160 Kbps is necessary for the two terminals.

Here, assuming that the communication speed of the wireless link between the communication unit for the base station (1806) and the base station (1810) is 16 Kbps, 32 Kbps, 64 Kbps, 158 Kbps, 256 Kbps, 512 Kbps and 1024 Kbps, when two cellular terminals perform the respective communications at the communication speed of 64 Kbps, the communication speed of the wireless link set up between the communication unit for the base station (1806) and the base station (1810) is 256 Kbps.

In this way, in the state where the wireless link of the communication speed of 256 Kbps between the communication unit for the base station (1806) and the base station (1810) is set up, when the cellular terminal (1801) newly requests for the communication of the communication speed of 64 Kbps through the IMT2000 network (1820), the communication speed necessary for three terminals is 240 Kbps.

Since this is equal to or less than the communication speed (256 Kbps) of the wireless link presently set up, the wireless communication apparatus (1800) determines that the re-setting of the wireless communication speed is not necessary in the step S604 of FIG. 11.

Further, when the cellular terminal (1801) requests for the communication of the communication speed of 64 Kbps through the IMT2000 network (1820), the communication speed necessary for four terminals is 320 Kbps.

Since this exceeds the communication speed (256 Kbps) of the wireless link presently set up, the wireless communication apparatus (1800) determines that the re-setting of the wireless communication speed is necessary in the step S604 of FIG. 11.

Accordingly, the wireless communication apparatus (1800) performs a wireless communication speed re-setting process with the base station (1800) in the step S605 by using the communication unit for the base station (1806) and changes the communication speed of the wireless link between the communication unit for the base station (1806) and the base station (1810) from 256 Kbps to 512 Kbps.

In this state, respective data from the four cellular terminals which the PHS communication units (1803), (1804) and the like have received are packetized by the communication multiplex/distribution unit (1805) in the form of the IMT2000 added with addresses and the like, multiplexed and transmitted from the communication unit for the base station (1806) to the base station (1810). The IMT2000 network (1820) transmits the packets from the four cellular terminals affiliated to the wireless communication apparatus (1800) to respective addresses.

On the contrary, while the four cellular terminals are in the midst of the communications, when one of them finishes the communication, the necessary communication speed changes from 320 Kbps to 240 Kbps. Therefore, the wireless communication apparatus (1800) determines that the re-setting of the wireless communication speed is necessary in the step S705 of FIG. 12, and the wireless communication apparatus (1800) performs the communication speed re-setting process with the base station (1810) in the step S706 so as to change the communication speed of the wireless link from 512 Kbps to 256 Kbps.

Further, while the three affiliated cellular terminals are in the midst of the communications, when one of them finishes the communication, the necessary communication speed changes from 240 Kbps to 160 Kbps. Therefore, the wireless communication apparatus (1800) determines that the re-setting of the wireless communication speed is not necessary in the step S705.

Note that the storage medium which stores the program code of the software for realizing the function of the above described embodiment is supplied to a system or an apparatus, and the computer of the system or the apparatus (or CPU and MPU) reads and realizes the program code stored in the storage medium, so that the present invention can be achieved.

In this case, the program code itself read from the storage medium realizes the function of the above described embodiment and the storage medium which stores the program code constitutes the present invention.

As the storage medium for supplying the program code, for example, a floppy disk, a hard disk, an optical disk, a photo-electromagnetic disk, CD-ROM, CD-R, a magnetic tape, a non-volatile memory card, ROM and the like can be used.

Further, by executing the program code read by the computer, not only the above described embodiment is realized, but the case where, based on the instruction of the program code, the OS and the like which operates on the computer performs a part or the whole of the actual process and, by that process, the above described function of the embodiment is realized is also included in the present invention.

Furthermore, the case where, after the program code read from the storage medium is written in the memory provided for a function expansion board inserted into the computer or the function expansion unit connected to the computer, based on the instruction of the program code, the CPU provided for the function expansion board or the function expansion unit performs a part or the whole of the actual process and, by that process, the function of the above described embodiment is realized is also included in the present invention.

What is claimed is:

1. A wireless communication apparatus comprising:
   forming means for forming a wireless communication channel to a base station;
   connection means for connecting a plurality of communication apparatuses to the wireless communication channel; and
   setting means for setting up a communication speed of the wireless communication channel according to the communication speed of a plurality of communication apparatuses,
   wherein said setting means maintains the communication speed of the wireless communication channel when a total sum of the speed of the communication which one of the plurality of communication apparatuses starts and the speed of the communication previously performed is equal to or less than the communication speed of the communication channel.

2. The wireless communication apparatus according to claim 1, wherein said setting means maintains the communication speed of the communication channel when one of a plurality of communication apparatuses finishes the communication and if the speed of another communication is more than a predetermined value.

3. The wireless communication apparatus according to claim 1, wherein said setting means sets the communication speed of the wireless communication channel according to the communication speed requested by the plurality of communication apparatuses and the communication speed of a control data used in the wireless communication channel.

4. The wireless communication apparatus according to claim 1, wherein said connection means connects the plurality of communication apparatuses according to a communication system different from the communication system used in the wireless communication channel.

5. The wireless communication apparatus according to claim 1, wherein said connection means performs a wireless communication with said plurality of communication apparatuses.

6. A wireless communication method comprising steps of:
   forming a communication channel to a base station;
   connecting a plurality of communication apparatuses to the communication channel; and
   setting the communication speed of the communication channel according to the communication speed of the plurality of communication apparatuses,
   wherein said setting step maintains the communication speed of the communication channel when a total sum of the speed of the communication which one of the plurality of communication apparatuses starts and the speed of the communication previously performed is equal to or less than the communication speed of the communication channel.

7. The wireless communication method according to claim 6, wherein said setting step maintains the communication speed of the communication channel when one of said plurality of communication apparatuses finishes the communication and if the speed of another communication is more than a predetermined value.

8. The wireless communication method according to claim 6, wherein setting step sets the communication speed of the wireless communication channel according to the communication speed requested by the plurality of communication apparatuses and the communication speed of a control data used on the wireless communication channel.

9. The wireless communication method according to claim 6, wherein said connecting step connects the plurality of communication apparatuses according to a communication system different from the communication system used in the communication channel.

10. The wireless communication method according to claim 6, wherein said connecting step performs a wireless communication with the plurality of communication apparatuses.

11. A wireless communication program, the program comprising steps of:
    forming a wireless communication channel to a base station;
    connecting a plurality of communication apparatuses to the wireless communication channel; and
    setting a communication speed of the wireless communication channel according to the communication speed of the plurality of communication apparatuses,
    wherein said setting step maintains the communication speed of the communication channel when a total sum of the speed of the communication which one of the plurality of communication apparatuses starts and the speed of the communication previously performed is equal to or less than the communication speed of the communication channel.

12. The wireless communication program according to claim 11, wherein said setting step maintains the communication speed of the communication channel when one of the plurality of communication apparatuses finishes the communication and if the speed of another communication is more than a predetermined value.

13. A wireless communication apparatus comprising:
    forming means for forming a wireless communication channel to a base station;
    connection means for connecting a plurality of communication apparatuses to the wireless communication channel; and
    setting means for setting a communication speed of the wireless communication channel according to the communication speed of the plurality of communication apparatuses,
    wherein said setting means maintains the communication speed of the communication channel when one of the plurality of communication apparatuses finishes the communication and if the speed of another communication is more than a predetermined value.

14. The wireless communication apparatus according to claim 13, wherein setting means sets the communication speed of the wireless communication channel according to the communication speed requested by the plurality of communication apparatuses and the communication speed of a control data used on the wireless communication channel.

15. The wireless communication apparatus according to claim 13, wherein said connection means connects the plurality of communication apparatus according to a communication system different from the communication system used in the wireless communication channel.

16. The wireless communication apparatus according to claim 13, wherein said connection means performs a wireless communication with said plurality of communication apparatuses.

17. A wireless communication apparatus comprising:
   forming means for forming a wireless communication channel to a base station;
   connection means for connecting a plurality of communication apparatuses to the wireless communication channel; and
   setting means for setting a communication speed of the wireless communication channel according to the communication speed requested by the plurality of communication apparatuses and the communication speed of a control data used on the wireless communication channel.

18. The wireless communication apparatus according to claim 17, wherein said connection means connects the plurality of communication apparatus according to a communication system different from the communication system used in the wireless communication channel.

19. The wireless communication apparatus according to claim 17, wherein said connection means performs a wireless communication with said plurality of communication apparatuses.

20. A wireless communication method comprising:
   forming a communication channel to a base station;
   connecting a plurality of communication apparatuses to the communication channel; and
   setting the communication speed of the communication channel according to the communication speed of the plurality of communication apparatuses,
   wherein said setting step maintains the communication speed of the communication channel when one of the plurality of communication apparatuses finishes the communication and if the speed of another communication is more than a predetermined value.

21. The wireless communication method according to claim 20, wherein setting step sets the communication speed of the wireless communication channel according to the communication speed requested by the plurality of communication apparatuses and the communication speed of a control data used on the wireless communication channel.

22. The wireless communication method according to claim 20, wherein said connecting step connects the plurality of communication apparatuses according to a communication system different from the communication system used in the communication channel.

23. The wireless communication method according to claim 20, wherein said connecting step performs a wireless communication with the plurality of communication apparatuses.

24. A wireless communication program, the program comprising steps of:
   forming a wireless communication channel to a base station;
   connecting a plurality of wireless communication apparatuses to the communication channel; and
   setting a communication speed of the wireless communication channel according to the communication speed of the plurality of communication apparatuses,
   wherein said setting step maintains the communication speed of the communication channel when one of the plurality of communication apparatuses finishes the communication and if the speed of another communication is more than a predetermined value.

25. A wireless communication method comprising steps of:
   forming a wireless communication channel to a base station;
   connecting a plurality of communication apparatuses to the wireless communication channel; and
   setting a communication speed of the wireless communication channel according to the communication speed requested by the plurality of communication apparatuses and the communication speed of a control data used on the wireless communication channel.

26. The wireless communication method according to claim 25, wherein said connecting step connects the plurality of communication apparatuses according to a communication system different from the communication system used in the communication channel.

27. The wireless communication method according to claim 25, wherein said connecting step performs a wireless communication with the plurality of communication apparatuses.

* * * * *